(12) United States Patent
Shimamoto et al.

(10) Patent No.: US 6,192,696 B1
(45) Date of Patent: Feb. 27, 2001

(54) REFRIGERATING APPARATUS

(75) Inventors: Daisuke Shimamoto; Tomohiko Kasai, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/138,747

(22) Filed: Aug. 24, 1998

(30) Foreign Application Priority Data

Dec. 25, 1997 (JP) .................................................. 9-357492

(51) Int. Cl.[7] .............................. F25B 1/00; F25B 41/00
(52) U.S. Cl. ............................. 62/209; 62/228.3; 62/502
(58) Field of Search ..................... 62/502, 228.3, 62/114, 209

(56) References Cited

U.S. PATENT DOCUMENTS

| | | | |
|---|---|---|---|
| 3,232,519 | 2/1966 | Long . | |
| 4,537,038 | 8/1985 | Alsenz et al. | 62/118 |
| 4,644,756 | 2/1987 | Sugimoto et al. | 62/160 |
| 4,718,246 | 1/1988 | Mitchell | 62/208 |
| 5,410,887 | 5/1995 | Urata et al. | 62/129 |
| 5,626,026 | 5/1997 | Sumida et al. | 62/129 |
| 5,685,163 | 11/1997 | Fujita et al. | 62/211 |
| 5,737,931 | 4/1998 | Ueno et al. | 62/126 |

FOREIGN PATENT DOCUMENTS

| | | |
|---|---|---|
| 676286 | 12/1990 | (CH) . |
| 40 08 877 | 10/1991 | (DE) . |
| 0 586 193 | 3/1994 | (EP) . |
| 0 685 692 | 12/1995 | (EP) . |
| 0 693 663 | 1/1996 | (EP) . |
| 0 751 356 | 1/1997 | (EP) . |
| 0 801 278 | 10/1997 | (EP) . |
| 2 305 744 | 4/1997 | (GB) . |
| 6-12201 | 2/1994 | (JP) . |
| 6-101911 | 4/1994 | (JP) . |
| 6-101912 | 4/1994 | (JP) . |

Primary Examiner—William Wayner
(74) Attorney, Agent, or Firm—Oblon, Spivak, McClelland, Maier & Neustadt, P.C.

(57) ABSTRACT

In a refrigerating apparatus using a non-azeotropic refrigerant, the composition is included among the quantities of state of a refrigerant, so that it is difficult to detect the state of the interior of the refrigerant circuit. For this reason, it is difficult to stabilize the operation of the refrigerating apparatus by detecting the state of the interior of the refrigerating apparatus, and avoid the malfunction of the refrigerating apparatus. The cyclic composition of the refrigerating apparatus is detected, and the state of the interior of the refrigerating apparatus is detected accurately by using this cyclic composition. In addition, the refrigerating apparatus is arranged such that in a case where there is a quantity of state which cannot be detected accurately owing to an error or the like of the detected cyclic composition, that value can be detected directly. As a result, it is possible to accurately detect the malfunction of the refrigerating apparatus and avoid this state.

4 Claims, 15 Drawing Sheets

——— : REFRIGERANT PIPING       ---▶ : DIRECTION OF OUTPUT OF CONTROL VALUE

1: COMPRESSOR
3: USING-SIDE HEAT EXCHANGER
4: THROTTLING DEVICE
5: HEAT SOURCE UNIT-SIDE HEAT EXCHANGER
7: FAN
13: SECOND PRESSURE DETECTOR
15: CYCLIC-COMPOSITION DETECTING DEVICE
16: FIRST PRESSURE DETECTOR
17: FAN/COMPRESSOR CAPACITY CONTROLLING MEANS
81: REFRIGERATING APPARATUS

27: THROTTLING-DEVICE-OPENING REDUCTION OUTPUTTING DIVECE
88: REFRIGERATING APPARATUS

——— : REFRIGERANT PIPING
---- ▶ : DIRECTION OF OUTPUT OF CONTROL VALUE

28: FOURTH TEMPERATURE DETECTOR
29: THIRD COMPRESSOR-STOP OUTPUTTING DEVICE
89: REFRIGERATING APPARATUS

28: FOURTH TEMPERATURE DETECTOR
30: FOURTH COMPRESSOR-STOP OUTPUTTING DEVICE
90: REFRIGERATING APPARATUS

——— : REFRIGERANT PIPING
---▶ : DIRECTION OF OUTPUT OF CONTROL VALUE

REFRIGERATING APPARATUS

BACKGROUND OF THE INVENTION

The present invention relates to a refrigerant circuit of a refrigerating apparatus using a non-azeotropic refrigerant and to refrigerant circuit control.

FIG. 15 is a conventional refrigerating apparatus in which a non-azeotropic refrigerant is used and which is disclosed in, for instance, Japanese Patent Application. Laid-Open No. 75280/1996. This refrigerating apparatus is provided with a refrigerating circuit in which a compressor 1, a condenser 3, a first capillary tube 4, an evaporator 5, and an accumulator 6 are sequentially connected in loop form by the piping and in which a non-azeotropic refrigerant circulates; a bypass pipe 8 which bypasses the refrigerant circuit from the pipe between the compressor 1 and the condenser 3 to the pipe between the compressor and the evaporator and in which a cooling means 9 and a second capillary tube 10 are connected; a temperature detector 12 and a pressure detector 13 for detecting the temperature and pressure of an outlet portion of the second capillary tube; and a composition calculator 14 for calculating the composition of the refrigerant circulating in the refrigerant circuit. The composition of the refrigerant circulating in the refrigerant circuit can be calculated in this refrigerating apparatus, and the operation of the refrigerating apparatus is controlled on the basis of this composition of the refrigerant.

With the conventional technology, however, there has been no method for maintaining the condensing temperature and the evaporating temperature to fixed levels as a means for appropriately controlling the operation of the refrigerating apparatus using a non-azeotropic refrigerant. Namely, since the condensing temperature and the evaporating temperature have been determined with the cyclic composition fixed or with the cyclic composition fixed for each operating condition, it has been impossible to follow up, or sufficiently follow up, changes in the condensing temperature and evaporating temperature with respect to changes in the cyclic composition. In addition, it has been impossible to demonstrate a predetermined capacity at the time of gas leakage or erroneous charging of the refrigerant.

Further, with the refrigerating apparatus using a non-azeotropic refrigerant, if the cyclic composition of the refrigerant changes, the condensing pressure and the evaporating pressure change in a case where the condensing temperature and the evaporating temperature change. For this reason, the flow rate of the refrigerant circuit changes, so that it is impossible to secure a stable capacity, and it is difficult to secure subcooling on the inlet side of a throttling device. Namely, there has been a problem in compatibility in the securing of subcooling and the securing of the refrigerant flow rate.

Further, with the refrigerating apparatus using a non-azeotropic refrigerant as well, in the operation at a low outdoor air temperature, since the refrigerant which left the compressor becomes condensed in the refrigerant pipe where the refrigerant is cooled, the amount of refrigerant supplied to the compressor temporarily becomes smaller than the amount of refrigerant which leaves the compressor, with the result that the pressure within the suction portion of the compressor declines, leading to the malfunction of the compressor.

Further, since the pressure is higher for R.407C than R.22 at the same temperature, the malfunction of the refrigerating apparatus due to an excess rise in the pressure at the discharge portion of the compressor has been more liable to occur in the case of the refrigerating apparatus using R.407C than in the case of the refrigerating apparatus using R.22.

In addition, with refrigerant R.407C, the malfunction of the compressor due to corona discharge under vacuum has been more liable to occur than refrigerant R.22.

In addition, with the refrigerating apparatus using refrigerant R.407C and ester oil and ether oil which are refrigerating machine oils used for R.407, sludges which adversely affect the refrigerating apparatus have been liable to occur in large amounts.

In addition, with the non-azeotropic refrigerant, it has been impossible to accurately detect the compression of the refrigerant in the compressor, with the result that a malfunction has been liable to occur in the compressor.

In addition, with the non-azeotropic refrigerant, it has been impossible to accurately detect the excessive superheating of the compressor on the discharge side of the compressor.

In addition, with the non-azeotropic refrigerant, it has been impossible to accurately detect a decline in the concentration of the lubricating oil in the compressor due to excessive supply of liquid refrigerant.

In addition, with the non-azeotropic refrigerant, it has been difficult to obtain subcooling at the condenser outlet.

SUMMARY OF THE INVENTION

The present invention aims to overcome the above-described problems, and its object is to make it possible to use a non-azeotropic refrigerant (including a pseudo-azeotropic refrigerant) in a refrigerating apparatus without trouble.

In accordance with a first aspect of the present invention, there is provided a refrigerating apparatus using a non-azeotropic refrigerant and provided with a refrigerant circuit in which a capacity variable compressor, a heat source unit-side heat exchanger, a throttling device, and a using-side heat exchanger are connected by the piping, a capability variable fan for the heat source unit-side heat exchanger, a first pressure detector at a discharge pipe of the compressor, a second pressure detector at a suction pipe of the compressor, and a refrigerant cyclic-composition detecting device, comprising:

fan/compressor capacity controlling means for determining a condensing temperature of the heat source unit-side heat exchanger or the using-side heat exchanger on the basis of a refrigerant cyclic composition detected by the cyclic-composition detecting device and a pressure detected by the first pressure detector, or determining an evaporating temperature of the heat source unit-side heat exchanger or the using-side heat exchanger on the basis of the refrigerant cyclic composition detected by the cyclic-composition detecting device and a pressure detected by the second pressure detector, so as to control the capacity of the compressor and the capability of the fan for the heat source unit-side heat exchanger so that the condensing temperature and the evaporating temperature are set to respective predetermined target values.

In accordance with a second aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a first pressure detector at a discharge pipe of the compressor, a second pressure detector at a suction pipe of the compressor, a refrigerant cyclic-composition detecting device, and a temperature detector for detecting the temperature of the refrigerant on an upstream side of the throttling device, comprising:

- a subcooling calculator for determining a condensing temperature of the heat source unit-side heat exchanger or the using-side heat exchanger on the basis of a refrigerant cyclic composition detected by the cyclic-composition detecting device and a pressure detected by the first pressure detector, for calculating a subcooling value of the refrigerant which enters the throttling device on the basis of the condensing temperature and the temperature detected by the temperature detector; and
- a throttling-device minimum opening outputting device for calculating a minimum opening of the throttling device on the basis of the refrigerant cyclic composition detected by the cyclic-composition detecting device, the pressure detected by the first pressure detector, and a pressure detected by the second pressure detector, for comparing the calculated minimum opening with an opening command from the subcooling calculator, and for outputting to the throttling device the opening command if the opening command is greater than the calculated minimum opening, and the calculated minimum opening if the opening command is less than or equal to the calculated minimum opening.

In accordance with a third aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a second pressure detector at a suction pipe of the compressor, and a bypass pipe for connecting a discharge pipe and the suction pipe of the compressor and having an opening/closing valve and a pressure reducing device, comprising:

- a first opening/closing output device for opening the opening/closing valve if a pressure detected by the second pressure detector is less than a predetermined value and for closing the opening/closing valve if the pressure detected by the second pressure detector is greater than or equal to the predetermined value.

In accordance with a fourth aspect of the present invention, there is provided a refrigerating apparatus using as a refrigerant a refrigerant which is an HFC-based refrigerant and whose saturation pressure is high at an identical temperature, the refrigerating apparatus being provided with a refrigerant circuit in which a compressor, a heat source unit-side heat exchanger, a throttling device, and a using-side heat exchanger are connected by the piping, a first pressure detector at a discharge pipe of the compressor, and a bypass pipe for connecting a discharge pipe and the suction pipe of the compressor and having an opening/closing valve and a pressure reducing device, comprising:

- a second opening/closing output device for opening the opening/closing valve if a pressure detected by the first pressure detector is greater than or equal to a predetermined value and for closing the opening/closing valve if the pressure detected by the first pressure detector is less than the predetermined value.

In accordance with a fifth aspect of the present invention, there is provided a refrigerating apparatus using as a refrigerant a refrigerant which is an HFC-based refrigerant and with which corona discharge is more liable to occur than R22, the refrigerating apparatus being provided with a refrigerant circuit in which a compressor, a heat source unit-side heat exchanger, a throttling device, and a using-side heat exchanger are connected by the piping, and a second pressure detector at a suction pipe of the compressor, comprising:

- a first compressor-stop outputting device for stopping the operation of the compressor if a pressure detected by the second pressure detector has become less than or equal to a predetermined value which indicates that the compressor is to effect vacuum operation.

In accordance with a sixth aspect of the present invention, there is provided a refrigerating apparatus using an HFC-based refrigerant as a refrigerant and provided with a refrigerant circuit in which a compressor, a heat source unit-side heat exchanger, a throttling device, and a using-side heat exchanger are connected by the piping, a third temperature detector at a discharge pipe of the compressor, and a bypass pipe for connecting a discharge pipe and the suction pipe of the compressor and having an opening/closing valve and a pressure reducing device, comprising:

- a third opening/closing output device for opening the opening/closing valve if a value detected by the third temperature detector is greater than or equal to a predetermined value and for closing the opening/closing valve if the pressure detected by the third temperature detector is less than the predetermined value.

In accordance with a seventh aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a first pressure detector at a discharge pipe of the compressor, a third temperature detector at a discharge pipe of the compressor, and a refrigerant cyclic-composition detecting device, comprising:

- a second compressor-stop outputting device for calculating a degree of superheating at the discharge pipe of the compressor on the basis of values detected by the first pressure detector, the third temperature detector, and the refrigerant cyclic-composition detecting device, and for stopping the operation of the compressor if a state in which the degree of superheating is less than or equal to a predetermined value has continued for a predetermined time duration.

In accordance with an eighth aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a first pressure detector at a discharge pipe of the compressor, a third temperature detector at a discharge pipe of the compressor, and a refrigerant cyclic-composition detecting device, comprising:

- a throttling-device-opening reduction outputting device for calculating a degree of superheating at the discharge pipe of the compressor on the basis of values detected by the first pressure detector, the third temperature detector, and the refrigerant cyclic-composition detecting device, and for closing an opening of the throttling device by a predetermined amount if a state in which the degree of superheating is less than or equal to a predetermined value has continued for a predetermined time duration.

In accordance with a ninth aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, comprising:

a fourth temperature detector for detecting a temperature of a refrigerating machine oil in the compressor; and a third compressor-stop outputting device for stopping the operation of the compressor if a value detected by the fourth temperature detector has become greater than or equal to a predetermined value, and if the state in which the detected value is greater than or equal to the predetermined value has continued for a predetermined time duration.

In accordance with a 10th aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a second pressure detector at a suction pipe of the compressor, and a refrigerant cyclic-composition detecting device, comprising:

a fourth compressor-stop outputting device for stopping the operation of the compressor if a difference between a temperature of a refrigerating machine oil detected by the fourth temperature detector in the compressor and a gas saturation temperature at a pressure detected by the second pressure detector with a composition of the refrigerant detected by the cyclic-composition detecting device has become less than or equal to a predetermined value, and if this state has continued for a predetermined time duration.

In accordance with an 11th aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, comprising:

a subcooling device for subcooling the refrigerant between the heat source unit-side heat exchanger and the throttling device during cooling operation.

DETAILED DESCRIPTION OF THE PREFERRED EMBODIMENTS

First Embodiment

Hereafter, a description will be given of the embodiments of the present invention.

Figure 1:
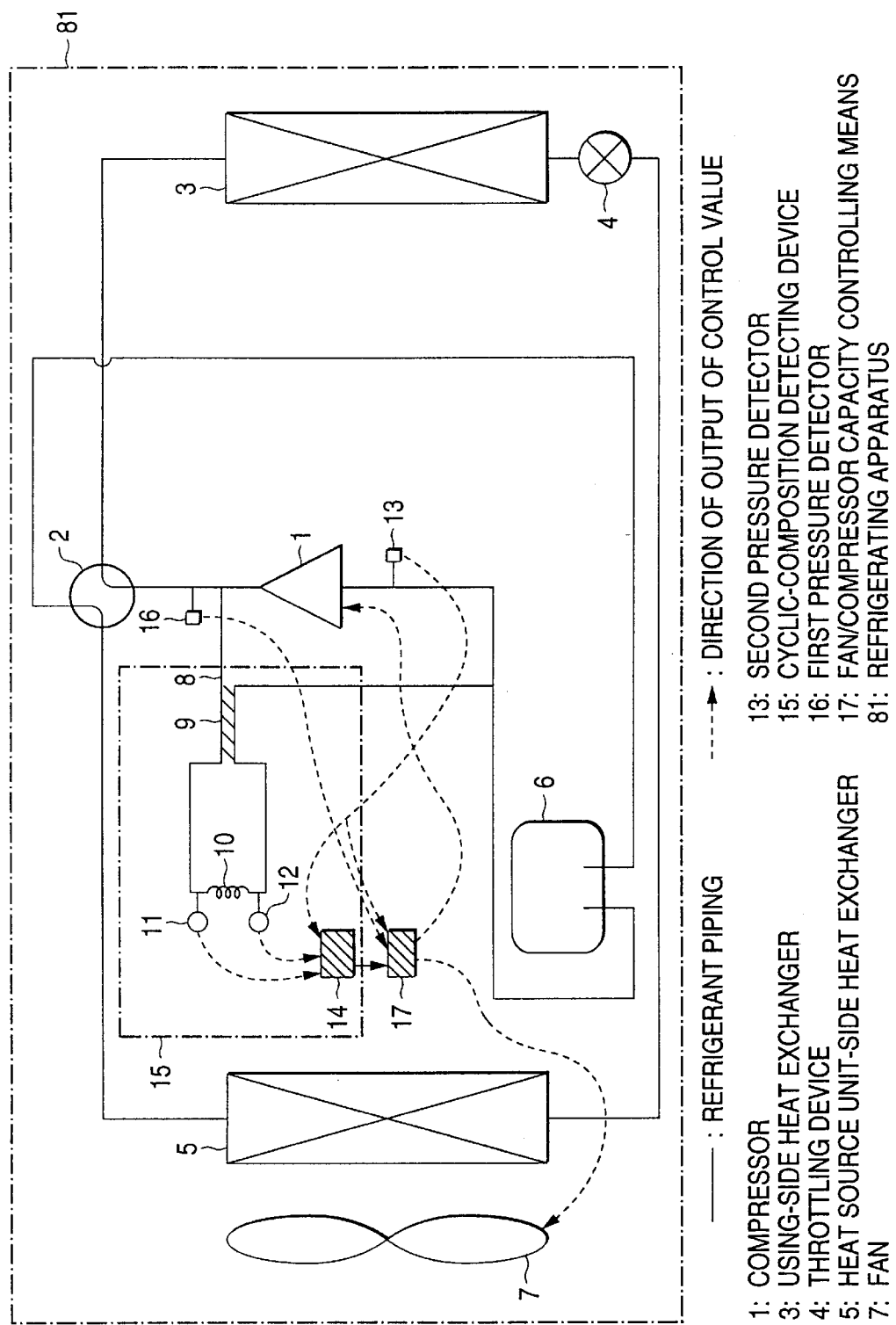
FIG. 1 is a diagram of a refrigerant circuit in accordance with a first embodiment of the present invention.

FIG. 1 illustrates a refrigerating apparatus 81 which is an example of the refrigerating and air-conditioning apparatus using a non-azeotropic refrigerant in accordance with the present invention. In this refrigerating apparatus 81, a capacity variable compressor 1, a four-way valve 2, an indoor-unit heat exchanger 3 which is a using-side heat exchanger, a first throttling device 4, an outdoor-unit heat exchanger 5 which is a heat source unit-side heat exchanger, an accumulator 6, and the compressor 1 are connected in series in this order by the piping, thereby forming a refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 81 is provided with a cyclic-composition detecting device 15, a first pressure detector 16 provided at a discharge pipe of the compressor 1, and a second pressure detector 13 provided at a suction pipe of the compressor 1. Further, the outdoor-unit heat exchanger is provided with a capability variable fan 7, and a fan-rotating-speed/compressor-frequency outputting device 17, which is a fan/compressor capacity variable means for outputting the rotational speed of the fan 7 and the frequency of the compressor 1, is provided. The capacity variable means may be formed separately as the fan-capability variable means and the compressor-capacity variable means.

In addition, R.407C, which is a non-azeotropic refrigerant in which R.32, R.125, and R.134a are mixed at a ratio of 23 wt. %, 25 wt. %, and 52 wt. %, is charged in the refrigerating apparatus 81 shown in FIG. 1.

In the drawing, the dotted lines show that control values are outputted in the directions of arrows.

Next, a description will be given of the operation of the refrigerating apparatus 81. During heating, the high-temperature, high-pressure refrigerant gas which is discharged from the compressor 1 flows into the indoor-unit heat exchanger 3 via the four-way valve 2, and condenses and liquifies on being cooled by the ordinary-temperature air and the like. The refrigerant which left the indoor-unit heat exchanger 3 undergoes pressure reduction by the first throttling device 4, and flows into the outdoor-unit heat exchanger 5. In the outdoor-unit heat exchanger 5, low temperature is produced, the refrigerant evaporates, gasifies, and flows out, and the gas refrigerant flows into the accumulator 6 via the four-way valve 2, and is sucked into the compressor 1 after passing the accumulator 6. The excess refrigerant in the refrigerating apparatus 81 is present inside the accumulator 6 in the form of the liquid refrigerant. At this time, the condensing temperature of the indoor-unit heat exchanger and the evaporating temperature of the outdoor-unit heat exchanger can be changed by changing the rotational speed of the fan 7 and by changing the rotational speed by changing the frequency of the compressor 1.

During cooling, the high-temperature, high-pressure refrigerant gas which is discharged from the compressor 1 flows into the outdoor-unit heat exchanger 5 via the four-way valve 2, and condenses and liquifies on being cooled by the ordinary-temperature air and the like. The refrigerant which left the outdoor-unit heat exchanger 5 undergoes pressure reduction by the throttling device 4, and flows into the indoor-unit heat exchanger 3. In the indoor-unit heat exchanger 3, low temperature is produced, the refrigerant evaporates, gasifies, and flows out, and the gas refrigerant flows into the accumulator 6 via the four-way valve 2, and is sucked into the compressor 1 after passing the accumulator 6. At this time, the condensing temperature of the outdoor-unit heat exchanger and the evaporating temperature of the indoor-unit heat exchanger can be changed by changing the rotational speed of the fan 7 and by changing the rotational speed by changing the frequency of the compressor 1.

Next, a description will be given of the operation of the cyclic-composition detecting device 15. In FIG. 1, reference numeral 8 denotes a bypass pipe bypassing the discharge pipe of the compressor 1 and the suction pipe of the compressor; 9, a first double-pipe heat exchanger; 10, a first pressure reducing device; 11, a first temperature detecting device; 12, a second temperature detector; 13, a second pressure detector; 14, a composition calculating device. These component parts, i.e., the bypass pipe 8, the first double-pipe heat exchanger 9; the first pressure reducing device 10, the first temperature detector 11, the second temperature detector 12, the second pressure detector 13, and the composition calculating device 14, constitute the cyclic-composition detecting device 15.

Part of the high-pressure gas refrigerant which left the compressor 1 passes through the bypass pipe 8, undergoes heat exchange with the low-pressure refrigerant in the first double-pipe heat exchanger 9 where it is liquified. Then, the liquid refrigerant is subjected to pressure reduction in the first pressure reducing device 10, and becomes a low-pressure two-phase refrigerant. Subsequently, the two-phase refrigerant undergoes heat exchange with the high-pressure refrigerant in the first double-pipe heat exchanger 9, evaporates, and gasifies before returning to the suction side of the compressor 1. In this apparatus, the temperature of the liquid refrigerant at the first temperature detector 11 and the temperature and pressure of the two-phase refrigerant at the second temperature detector 12 and the second pressure detector 13 are detected (since the value of the second pressure detector 13 and the outlet pressure at the first pressure reducing device 10 are substantially equal, the outlet pressure of the first pressure reducing device 10 is set as the value of the second pressure detector 13). On the basis of the temperature and pressure, the cyclic composition of the non-azeotropic refrigerant in the refrigerating apparatus 81 is calculated and detected by the composition calculating device 14. The detection of this cyclic composition is constantly effected while power of the refrigerating and air-conditioning apparatus is on.

Here, a description will be given of the method of calculating the cyclic composition of the refrigerant. Since R.407C is a three-kinds-mixed non-azeotropic refrigerant, and the three kinds of components of the cyclic composition of the refrigerant are unknowns, if three equations are formulated, and if they are solved, the unknown components of the cyclic composition can be known. However, if the three kinds of the cyclic components are added together, the result is 1. Hence, if R.32 is expressed as $a32$, R.125 as $a125$, and R.134a as $a134a$, the following formula always holds:

$$a32 + a125 + a134a = 1 \quad (1)$$

Therefore, if two equations (excluding the above formula $a32+a125+a134a=1$) are formulated with respect to two unknown kinds of cyclic components, and if they are solved, the cyclic components can be known. For example, if two equations in which $a32$ and $a125$ are unknown can be formulated, the cyclic components can be known.

Then, a description will be given of the method of formulating the equations in which $a32$ and $a125$ are unknown.

Figure 2:
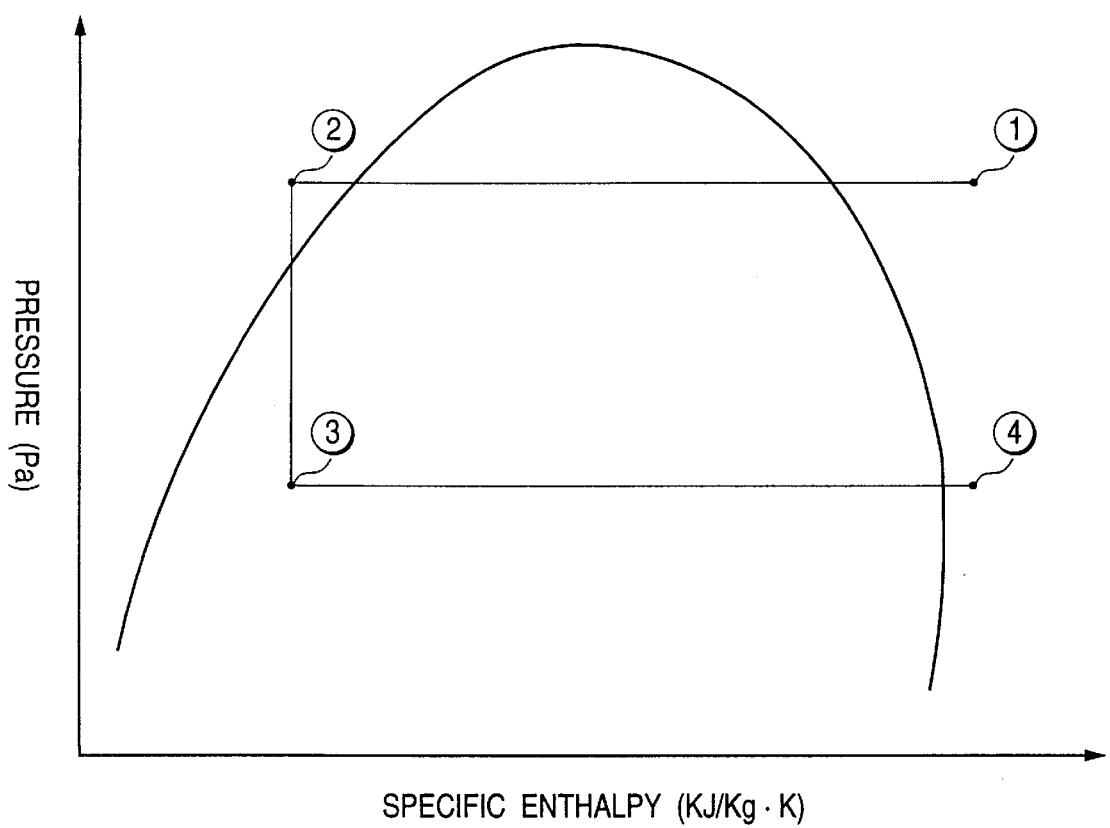
FIG. 2 is a Mollier diagram illustrating changes in a refrigerant in a cyclic-composition detecting device in accordance with the first embodiment of the present invention.

First, the first equation can be formulated from the cyclic-composition detecting device 15 shown in FIG. 1. FIG. 2 is a Mollier diagram illustrating changes in the state of the refrigerant in the cyclic-composition detecting device 15. In the drawing, 1) shows the state of the high-pressure gas refrigerant which left the compressor 1; 2) shows the state in which the gas refrigerant has undergone heat exchange with the low-pressure refrigerant in the double-pipe heat exchanger 9 and has liquified; 3) shows the state in which the liquid refrigerant has been subjected to pressure reduction in the first pressure reducing device 10, and has becomes a low-pressure two-phase refrigerant; and 4) shows the state in which the two-phase refrigerant has undergone heat exchange with the high-pressure refrigerant in the double-pipe heat exchanger 9, and has evaporated and gasified. Since enthalpies in 2) and 3) in FIG. 2 are the same, it is possible to formulate an equation in which $a32$ and $a125$ are unknown and the enthalpies in 2) and 3) are equal. Namely, if it is assumed that the enthalpy in 2) is h1, the enthalpy in 3) is ht, the temperature detected by the first temperature detector 11 is T11, the temperature detected by the second temperature detector 12 is T12, and the pressure detected by the pressure detector 13 is P13, it is possible to derive the following equation:

$$h1(a32, a125, T11) = ht(a32, a125, T12, P13) \quad (2)$$

In the second equation, insofar as the refrigerant initially charged into the refrigerating apparatus is R.407C, a gas-liquid equilibrium is valid, and fixed relationships exist among the components of the cyclic composition even when the liquid is accumulated in the accumulator and after the refrigerant leakage has occurred. Namely, if it is assumed that A and B are constants, it is possible to formulate the following experimental formula on the gas-liquid equilibrium composition:

$$a32 = A \times a125 + B \quad (3)$$

By solving the two formulae (2) and (3) formulated as described above, it is possible to determine $a32$, $a125$, and $a134a$.

Then, from the formulae $a32 = A_x a125 + B$ and $a32 + a125 + a134a = 1$, if the value of one of the three kinds of components of the cyclic composition are already known, the values of the other components can also be determined from these formulae. Hence, $a32$ is also represented as a representative value $a$ of the cyclic composition.

In addition, although the three-kinds-mixed non-azeotropic refrigerant is used in this embodiment, in a two-kinds-mixed non-azeotropic refrigerant the cyclic composition is determined by only the remaining formula other than the experimental formula on the gas-liquid equilibrium composition.

Next, a description will be given of the composition in the refrigerating apparatus 81. The compositions of the refrigerant circulating in the refrigeration cycle, including the composition of the gas refrigerant inside the accumulator 6, are identical since the refrigerant is circulating in the refrigeration cycle. Accordingly, during heating, the gas refrigerant in the accumulator 6, the gas refrigerant discharged from the compressor 1, and the liquid refrigerant at the outlet of the indoor-unit heat exchanger 3 become identical in terms of their compositions. Meanwhile, during cooling as well, the gas refrigerant in the accumulator 6, the gas refrigerant discharged from the compressor 1, and the liquid refrigerant at the outlet of the outdoor-unit heat exchanger 5 become identical in terms of their compositions. On the other hand, if the gas refrigerant and the liquid refrigerant in the accumulator 6 are considered, the relationship of gas-liquid equilibrium exists in the accumulator 6. When the gas-liquid equilibrium exits in the non-azeotropic refrigerant, the gas becomes a refrigerant which contains larger quantities of low-boiling components than the liquid. Accordingly, the gas refrigerant in the accumulator 6 becomes a refrigerant in which low-boiling refrigerants R.32 and R.125 are contained in larger quantities than the liquid refrigerant. On the other hand, the liquid refrigerant in the accumulator 6 becomes a refrigerant in which the high-boiling refrigerant R.134a is contained in a larger quantity than the gas refrigerant. The total refrigerant in the refrigerating apparatus 81 is a refrigerant in which the refrigerant circulating in the refrigerating apparatus 81 and the liquid refrigerant in the accumulator 6 are added together, and since the composition of the added refrigerant becomes identical to the composition of the charged refrigerant R.407C. Therefore, in a case where the liquid refrigerant is present in the accumulator 6, the composition of the refrigerant circulating in the refrigeration cycle shown in FIG. 1, including the composition of the gas refrigerant in the accumulator 6, becomes a refrigerant in which the low-boiling refrigerants R.32 and R.125 are contained in larger quantities than the charged refrigerant, while the composition of the liquid refrigerant in the accumulator 6 becomes a refrigerant in which the high-boiling refrigerant R.134a is contained-in a larger quantity than the composition of the charged refrigerant R.407C. Further, in a case where the liquid refrigerant is not present in the accumulator 6, the composition of the refrigerant circulating in the refrigerating apparatus 81 in FIG. 1 becomes the same composition as that of R.407C.

Next, a description will be given of a method of controlling the operation of the fan-rotating-speed/compressor-frequency outputting device 17 for controlling the condensing temperature and the evaporating temperature of the refrigerant circuit in accordance with the first embodiment of the present invention. During the operation of the refrigerating apparatus, the fan-rotating-speed/compressor-frequency outputting device 17 determines an average value of the gas saturation temperature and the liquid saturation temperature at a detected value P16 on the basis of the value P16 detected by the first pressure detector 16, a calculation made by the composition calculator 14, and the detected value a of the cyclic composition, and this average value is set as the condensing temperature. Also, the fan-rotating-speed/compressor-frequency outputting device 17 determines an average value of the gas saturation temperature and the liquid saturation temperature at a detected value P13 on the basis of the value P13 detected by the second pressure detector 13 and the detected value a of the cyclic composition, and this average value is set as the evaporating temperature. However, the value T12 of the second temperature detector 12 may be set as the evaporating temperature. The fan-rotating-speed/compressor-frequency outputting device 17 calculates and compares the thus-determined condensing temperature and evaporating temperature with the respective target values incorporated therein, and outputs the rotational speed of the fan 7 and the frequency of the compressor 1 to the fan 7 and the compressor 1, respectively, so that the respective values will be set to the targeted values.

As a specific example of controlling the fan-rotating-speed/compressor-frequency outputting device 17, control is effected through a combination of an increase in the condensing temperature and a decrease in the evaporating temperature due to an increase in the frequency (an increase in the speed of rotation) of the compressor 1, or a decrease in the condensing temperature and an increase in the evaporating temperature due to a decrease in the frequency (a decrease in the speed of rotation) of the compressor 1, as well as a decrease in the condensing temperature during cooling and an increase in the evaporating temperature during heating due to an increase in the speed of rotation (an increase in the air volume of the fan) of the fan 7, or an increase in the condensing temperature during cooling and a decrease in the evaporating temperature during heating-due to a decrease in the speed of rotation of the fan 7.

In addition, as for the control for changing the speed of rotation by the frequency of the compressor 1, the capacity may be controlled by using a compressor provided with a so-called capacity controlling mechanism.

Further, although, in the above-described embodiment, the fan-rotating-speed/compressor-frequency outputting device 17 determines the condensing temperature and the evaporating temperature, devices for respectively determining them or a device for determining both of them may be provided separately, and the condensing temperature and the evaporating temperature may be determined by these devices and may be outputted to the fan-rotating-speed/compressor-frequency outputting device 17.

Further, in the case of a unit which performs operation at a fixed frequency and with a fixed indoor-unit capacity in which changes in the condensing temperature or the evaporating temperature are not large, one kind of control may be provided, such as the control of only the fan or the control of only the compressor.

Second Embodiment

In the first embodiment of the present invention, control is provided to set the condensing temperature and the evaporating temperature to fixed levels so as to secure a fixed capacity of the refrigerating and air-conditioning apparatus; however, if the cyclic composition of the refrigerant changes, the condensing temperature and the evaporating temperature are fixed, but the condensing pressure and the evaporating pressure change. For this reason, a pressure difference at the inlet and outlet of the first throttling device 4 changes, so that the rate of flow in the refrigerant circuit and subcooling at the inlet of the first throttling device 4 in the flowing direction of the refrigerant also change. Therefore, with the opening of the first throttling device 4 fixed, the rate of flow in the refrigerant circuit and subcooling at the inlet of the first throttling device 4 in the flowing direction of the refrigerant undergo change owing to the change in the cyclic composition of the refrigerant, so that an optimal range of the opening of the first throttling device 4 change due to the cyclic composition of the refrigerant. Accordingly, in a second embodiment of the present invention, such a minimum opening of the first throttling device 4 that makes it possible to secure the rate of flow in the refrigerant circuit and subcooling at the inlet of the first throttling device 4 in the flowing direction of the refrigerant may be set by using the pressure difference across the first throttling device 4 which changes by the change in the cyclic composition of the refrigerant.

Figure 3:
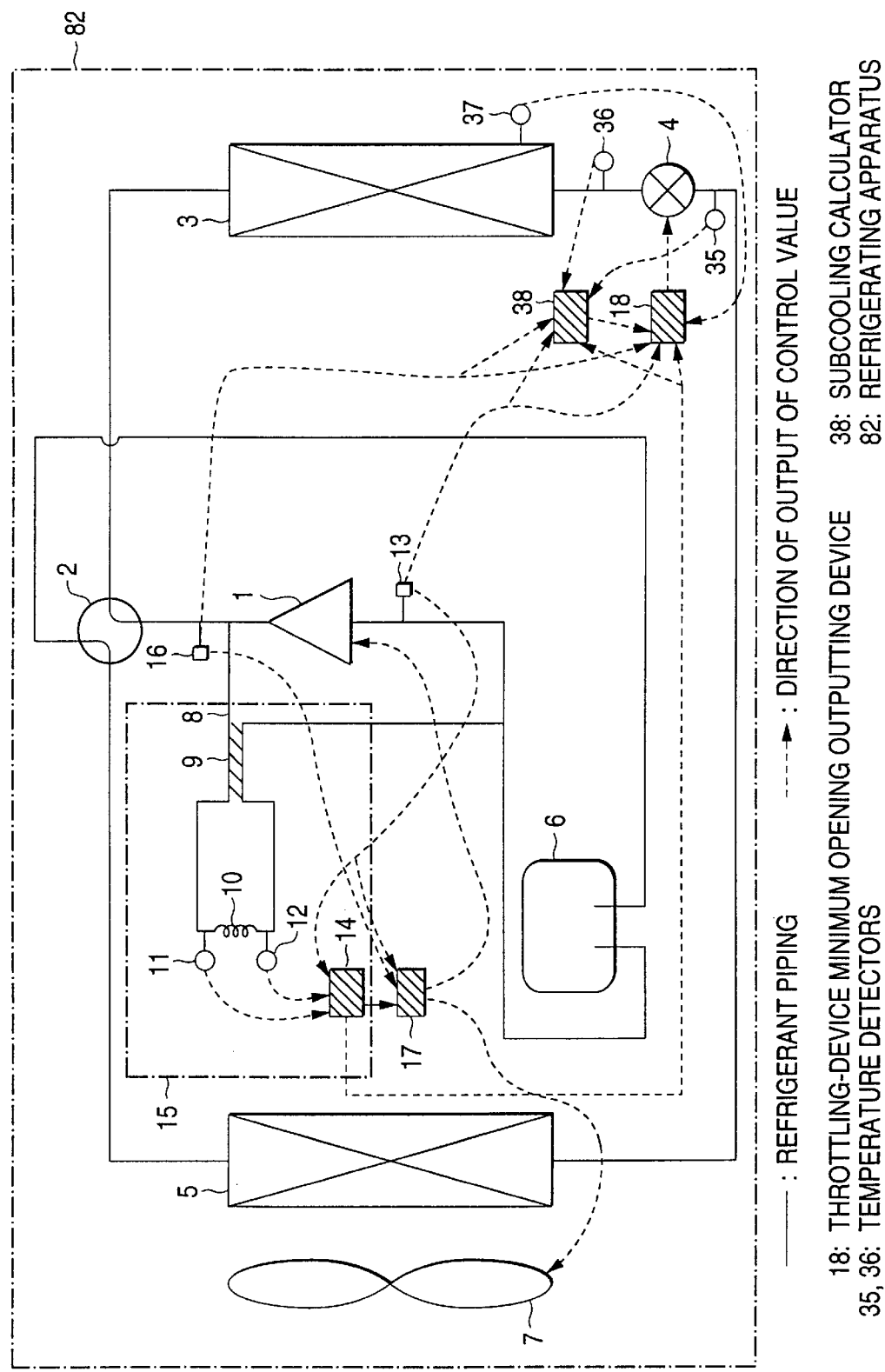
FIG. 3 is a diagram of a refrigerant circuit in accordance with a second embodiment of the present invention.

FIG. 3 illustrates a refrigerating apparatus 82 which is an example of the refrigerating and air-conditioning apparatus using a non-azeotropic refrigerant in accordance with the present invention. In this refrigerating apparatus 82, the capacity variable compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 82 is provided with the cyclic-composition detecting device 15, the first pressure detector 16 provided at the discharge pipe of the compressor 1, the second pressure detector 13 provided at the suction pipe of the compressor 1, a fifth temperature detector 35 and a sixth temperature detector 36 respectively disposed before and after the first throttling device 4, and a seventh temperature detector 37 provided for the indoor-unit heat exchanger for detecting the room temperature. Further, the outdoor-unit heat exchanger is provided with the capability variable fan 7. The refrigerating apparatus 82 is further provided with the fan-rotating-speed/compressor-frequency outputting device 17, which is a fan/compressor capacity controlling means for outputting the rotational speed of this fan 7 and the frequency of the compressor 1, as well as a throttling-device minimum opening calculator 18 for calculating and outputting a minimum opening of the first throttling device 4 and a subcooling calculator 38 for calculating and outputting the degree of subcooling before and after the first throttling device 4. The arrangement shown in FIG. 3 is similar to that of the first embodiment of the present invention except that the throttling-device minimum opening calculator 18, the fifth temperature detector 35, the sixth temperature detector 36, the seventh temperature detector 37, and the subcooling calculator 38 are provided, so that a description of the similar components will be omitted.

Next, a description will be given of the subcooling calculator 38 and the throttling-device minimum opening calculator 18. During the cooling operation, the subcooling calculator 38 calculates a temperature difference in which the value of the fifth temperature detector 35 is subtracted from the condensing temperature at the value P16 of the first pressure detector 16 and the refrigerant cyclic composition a, while, during the heating operation, the subcooling calculator 38 calculates a temperature difference in which the value of the sixth temperature detector 36 is subtracted from the condensing temperature at the value P16 of the first pressure detector 16 and the refrigerant cyclic composition a, thereby calculating subcooling in the first throttling device 4 so as to control the opening of the first throttling device 4 so that subcooling will be set to a predetermined targeted value. However, if the first throttling device 4 is controlled by the subcooling calculator 38, there are cases where even though subcooling can be secured, the flow rate of the refrigerant becomes small, resulting in a shortage in the capacity. Hence, it is necessary to specify a minimum opening for the first throttling device 4. For this reason, the value P16 of the first pressure detector 16, the P13 of the second pressure detector 13, and the refrigerant cyclic composition a are inputted to the throttling-device minimum opening calculator 18 to output a throttling-device minimum opening X through the formulae listed below, and control is thereby provided so as to not to allow the opening of the first throttling device 4 to become smaller than this X, thus preventing the occurrence of a shortage in the flow rate of the refrigerant due to excessive throttling. Namely, the throttling-device minimum opening outputting device 18 receives a command on the opening of the first throttling device 4 from the subcooling calculator 38, and if this opening command is greater than X, the throttling-device minimum opening outputting device 18 outputs to the first throttling device 4 the value of the opening command determined by the subcooling calculator 38, whereas if the opening command is greater than or equal to X, the throttling-device minimum opening outputting device 18 outputs to the first throttling device 4 a command in which the value is set to X. Through the control which takes the refrigerant cyclic composition a into consideration, an optimum opening of the first throttling device 4 which does not make the amount of refrigerant excessively small and makes it possible to secure subcooling can be ensured.

During heating: $X=K \cdot (Tc-T37)/\sqrt{(P16-P13)}$ (4)

During cooling: $X=K \cdot (T37-Te)/\sqrt{(P16-P13)}$ (5)

Here, K is a coefficient of the minimum opening of the throttling device, Tc is the condensing temperature calculated from P16 and a, Te is the evaporating temperature calculated from P13 and a, and T37 is the room temperature of the indoor-unit heat exchanger detected by the seventh temperature detector 37.

The above Formulae (4) and (5) are derived as shown below. If it is assumed that the amount of heat exchange between the indoor-unit heat exchanger 3 and the refrigerant flowing through the indoor-unit heat exchanger 3 is Q1, the amount of heat exchange between the indoor-unit heat exchanger 3 and the indoor unit-side air is Q2, and the opening of the first throttling device 4 is Xa, we have $Q1\, Xa \cdot \sqrt{(P16-P13)}$ (6)

During heating: $Q2\, (Tc-T37)$ (7)

During cooling: $Q2\, (T37-Te)$ (8)

In addition, since Q1=Q2, the following formulae hold:

During heating: $Xa \cdot \sqrt{(P16-P13)}\, (Tc-T37)$ (9)

During cooling: $Xa \cdot \sqrt{(P16-P13)}\, (T37-Te)$ (10)

As the formulae on X at which the refrigerant of a minimum level flows in terms of the flow rate, it is possible to formulate (4) and (5) on the basis of the formulae (9) and (10).

Furthermore, in the control for setting the evaporating temperature Te and the condensing temperature Tc to fixed levels, since $\sqrt{(P16-P13)}$ becomes a function of a, K may be set as a function of a, i.e., K(a), as follows:

During heating: $X=K(a) \cdot (Tc-T37)$ (11)

During cooling: $X=K(a) \cdot (T37-Te)$ (12)

In addition, although in this embodiment the subcooling calculator 38 determines the condensing temperature, a condensing-temperature determining device may be provided separately to output the condensing temperature to the subcooling calculator 38. Still alternatively, a device may be provided separately which is adapted to receive both the opening command from the subcooling calculator 38 and an output on the minimum opening calculated by the throttling-device minimum opening calculator 18, makes a comparison between them, and outputs either the opening command or the calculated minimum opening to the first throttling device 4.

Figure 4:
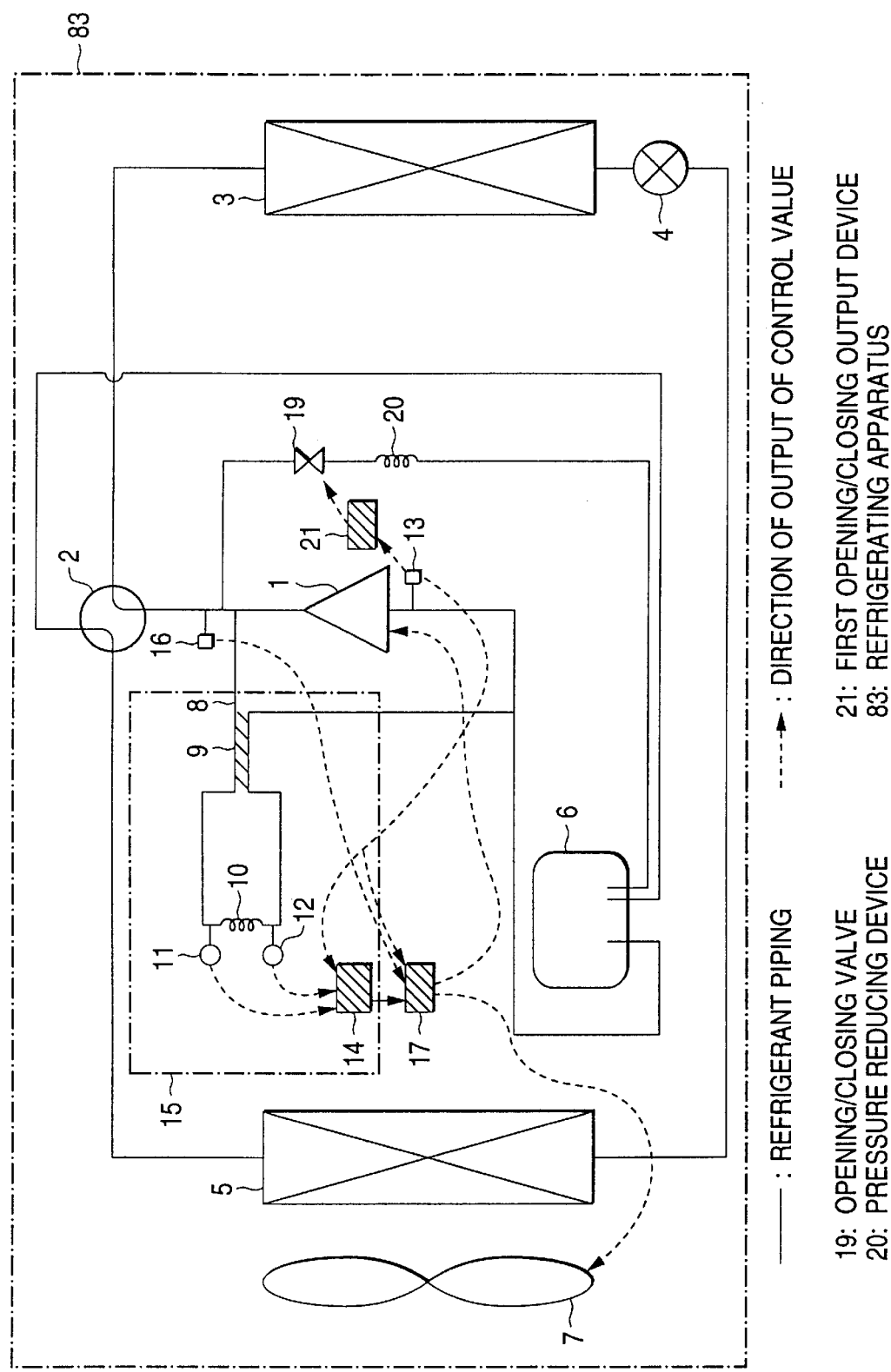
FIG. 4 is a diagram of a refrigerant circuit in accordance with a third embodiment of the present invention.

FIG. 4 illustrates a refrigerating apparatus 83 which is an example of the refrigerating and air-conditioning apparatus using a non-azeotropic refrigerant in accordance with the present invention. In this refrigerating apparatus 83, the compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 83 is provided with the cyclic-composition detecting device 15, the first pressure detector 16 provided at the discharge pipe of the compressor 1, and the second pressure detector 13 provided at the suction pipe of the compressor 1. Further, the outdoor-unit heat exchanger is provided with the fan 7, and the rotational speed of the fan 7 and the frequency of the compressor 1 are calculated and changed by the fan-rotating-speed/compressor-frequency outputting device 17. The refrigerating apparatus 83 is further provided with a bypass pipe, which connect the discharge pipe of the compressor 1 and the accumulator 6 and in which an opening/closing valve 19 and a second pressure reducing device 20 are connected in series, as well as a first opening/closing output device 21 for outputting a command on the opening and closing of the opening/closing valve 19 on the basis of the value of the second pressure detector 13. The arrangement shown in FIG. 4 is similar to that of the first embodiment of the present invention except for the bypass pipe with the opening/closing valve 19 and the second pressure reducing device 20 connected in series and the first opening/closing output device 21, so that a description of the similar components will be omitted.

Next, a description will be given of control and operation in accordance with the third embodiment of the present invention. The first opening/closing output device 21 outputs to the opening/closing valve 19 a signal to open the opening/closing valve 19 when, during the operation of the compressor 1, the value of the second pressure detector 13 has become a predetermined value at which the suction pressure is considered to be excessively low, e.g., less than 1 kgf/cm$^2$G, whereas the first opening/closing output device 21 outputs to the opening/closing valve 19 a signal to close the opening/closing valve 19 when the value of the second pressure detector 13 has become greater than or equal to 1 kgf/cm$^2$G. The opening/closing valve 19 is opened or closed in response to this signal. Through this control, the high-temperature, high-pressure gas at the discharge portion of the compressor 1 is subjected to pressure reduction by the second pressure reducing device 20, and is then supplied to the interior of the accumulator. At this time, the refrigerant which contains a large quantity of the low-boiling component R.32 in the refrigerant R.407C accumulated in the accumulator evaporates, and the refrigerant is supplied to the compressor 1. As for this refrigerant containing a large quantity of R.32, its saturation pressure at the same temperature is higher than that of the refrigerant having the components of R.407C. For this reason, it is possible to increase the pressure at the suction portion of the compressor 1 through two effects that the refrigerant can be supplied to the compressor 1 and that the supplied refrigerant is a refrigerant having high saturation pressure.

Figure 5:
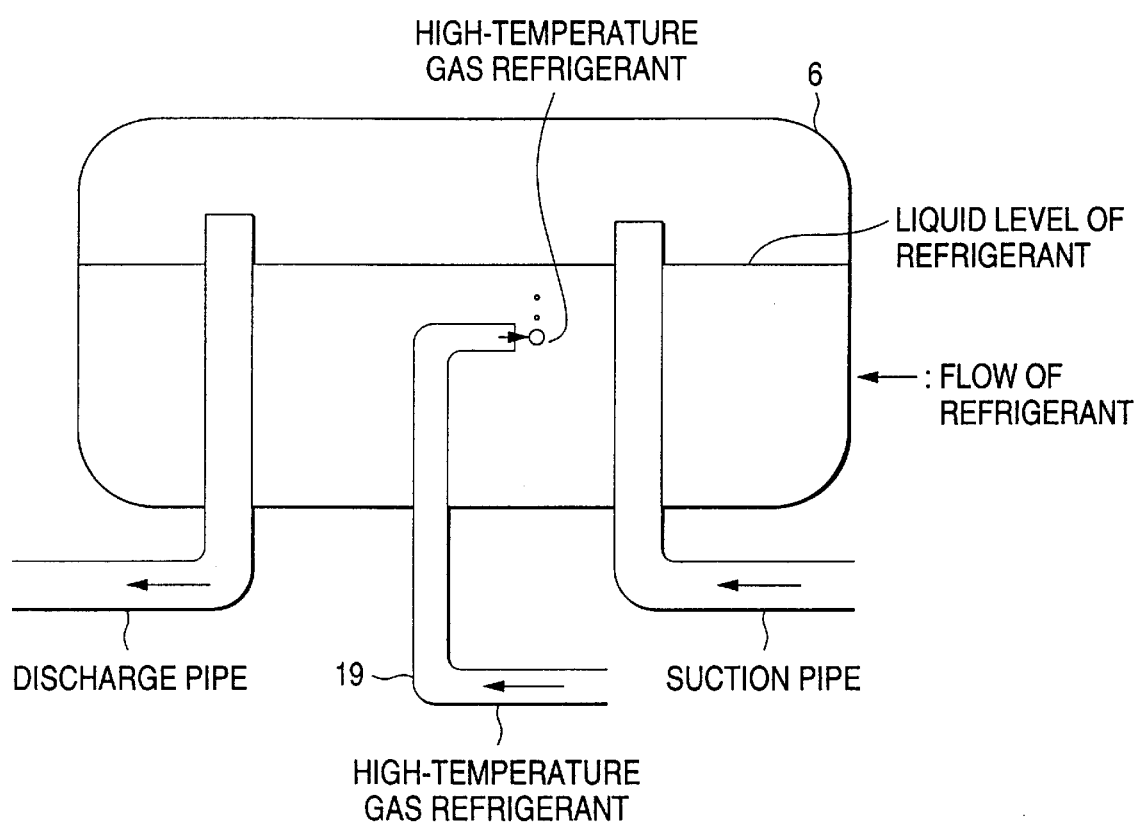
FIG. 5 is a diagram of a connecting portion between an accumulator and a bypass pipe for a high-temperature gas refrigerant.

In addition, as shown in FIG. 5, if the point of contact between the accumulator 6 and the pipe in which the opening/closing valve 19 and the second pressure reducing device 20 are connected in series is arranged such that a distal end portion of the bypass pipe is bent laterally, and is made open in the lateral direction instead of being made open in the upward direction, the liquid refrigerant in the accumulator is difficult to enter the bypass pipe including the opening/closing valve 19 and the second pressure reducing device 20, and the high-temperature gas refrigerant can be easily supplied into the refrigerant accumulated in the accumulator. As a result, the refrigerant accumulated in the accumulator can be made to foam, thereby making it possible to allow the accumulated refrigerant to evaporate efficiently.

Incidentally, although one end of the bypass pipe is connected to the accumulator 6, the bypass pipe may be connected to the upstream- or downstream-side pipe of the accumulator 6 insofar as the pipe is the suction pipe of the compressor.

Fourth Embodiment

In terms of the saturation pressure of R.22 and R.407C in the case where the temperature is the same, the saturation temperature of R.407C is higher by 2 kgf/cm$^2$ or more, at the temperature of 50° C. the pressure at the discharge portion of the compressor 1 becomes higher in the case of R.407C. Accordingly, in a third embodiment of the present invention, the opening/closing valve 19 is opened when the value of the second pressure detector 13 is less than a fixed value so as to raise the pressure at the suction portion of the compressor 1, but, the pressure at the discharge portion of the compressor 1 may be lowered by opening the opening/closing valve 19 so as to protect the compressor 1.

Figure 6:
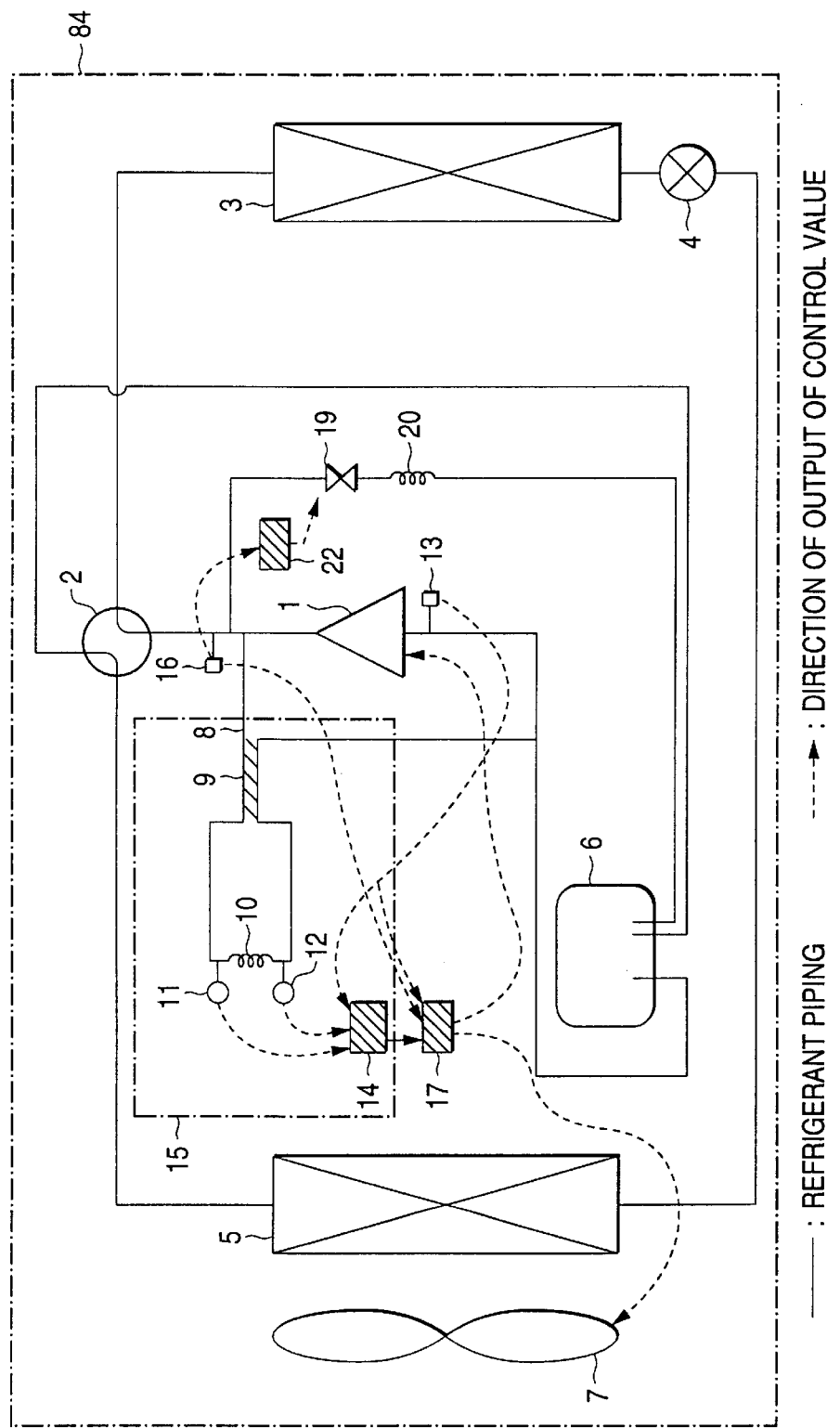
FIG. 6 is a diagram of a refrigerant circuit in accordance with a fourth embodiment of the present invention.

FIG. 6 illustrates a refrigerating apparatus 84 which is an example of the refrigerating and air-conditioning apparatus using a non-azeotropic refrigerant in accordance with the present invention. In this refrigerating apparatus 84, the compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 84 is provided with the cyclic-composition detecting device 15, the first pressure detector 16 provided at the discharge pipe of the compressor 1, and the second pressure detector 13 provided at the suction pipe of the compressor 1. Further, the outdoor-unit heat exchanger is provided with the fan 7, and the rotational speed of the fan 7 and the frequency of the compressor 1 are calculated and changed by the fan-rotating-speed/compressor-frequency outputting device 17. The refrigerating apparatus 84 is further provided with the bypass pipe, which connect the discharge pipe of the compressor 1 and the accumulator 6 and in which the opening/closing valve 19 and the second pressure reducing device 20 are connected in series, as well as a second opening/closing output device 22 for outputting a command on the opening and closing of the opening/closing valve 19 on the basis of the value of the first pressure detector 16. The arrangement shown in FIG. 6 is similar to that of the first embodiment of the present invention except for the bypass pipe with the opening/closing valve 19 and the second pressure reducing device 20 connected in series and the second opening/closing output device 22, so that a description of the similar components will be omitted.

Next, a description will be given of control and operation in accordance with the fourth embodiment of the present invention. The second opening/closing output device 22 outputs to the opening/closing valve 19 a signal to close the opening/closing valve 19 when, during the operation of the compressor 1, the value of the first pressure detector 16 has become a predetermined pressure determined by taking the pressure resistance of the unit into consideration, e.g., less than 27 kgf/cm$^2$G, whereas the second opening/closing output device 22 outputs to the opening/closing valve 19 a signal to open the opening/closing valve 19 when the value of the first pressure detector 16 has become greater than or equal to 27 kgf/cm$^2$G. The opening/closing valve 19 is opened or closed in response to this signal. Through this control, part of the high-temperature, high-pressure gas at the discharge portion of the compressor 1 flows through the pipe in which the opening/closing valve 19 and the second pressure reducing device 20 are connected in series, and bypasses the main line so as to be supplied to the accumulator, so that the pressure at the discharge portion of the compressor 1 is reduced.

In addition, in another embodiment of the present invention, the opening/closing pressure of the opening/closing valve 19 may be set as a function of the refrigerant cyclic composition a by taking into account the fact that the saturation pressure changes due to the refrigerant cyclic composition. Namely, the opening/closing pressure can be made large or small by the relative magnitude of the saturation pressure, and it is possible to prevent a decline in the capacity due to a shortage in the amount of refrigerant flowing in the main circuit particularly in the case of the composition whose saturation pressure is large.

As the refrigerant in this embodiment, a refrigerant which is an HFC-based refrigerant and whose saturation pressure is higher than that of R.22 at the same temperature is effective.

Fifth Embodiment

Since refrigerant R.407C has a low dielectric constant as compared to refrigerant R22, in the case where the compressor is operated under vacuum, corona discharge is liable to occur in the case of R.407C (shortcircuiting of a motor section and the like), and damage to the compressor is liable to occur due to this phenomenon.

Figure 7:
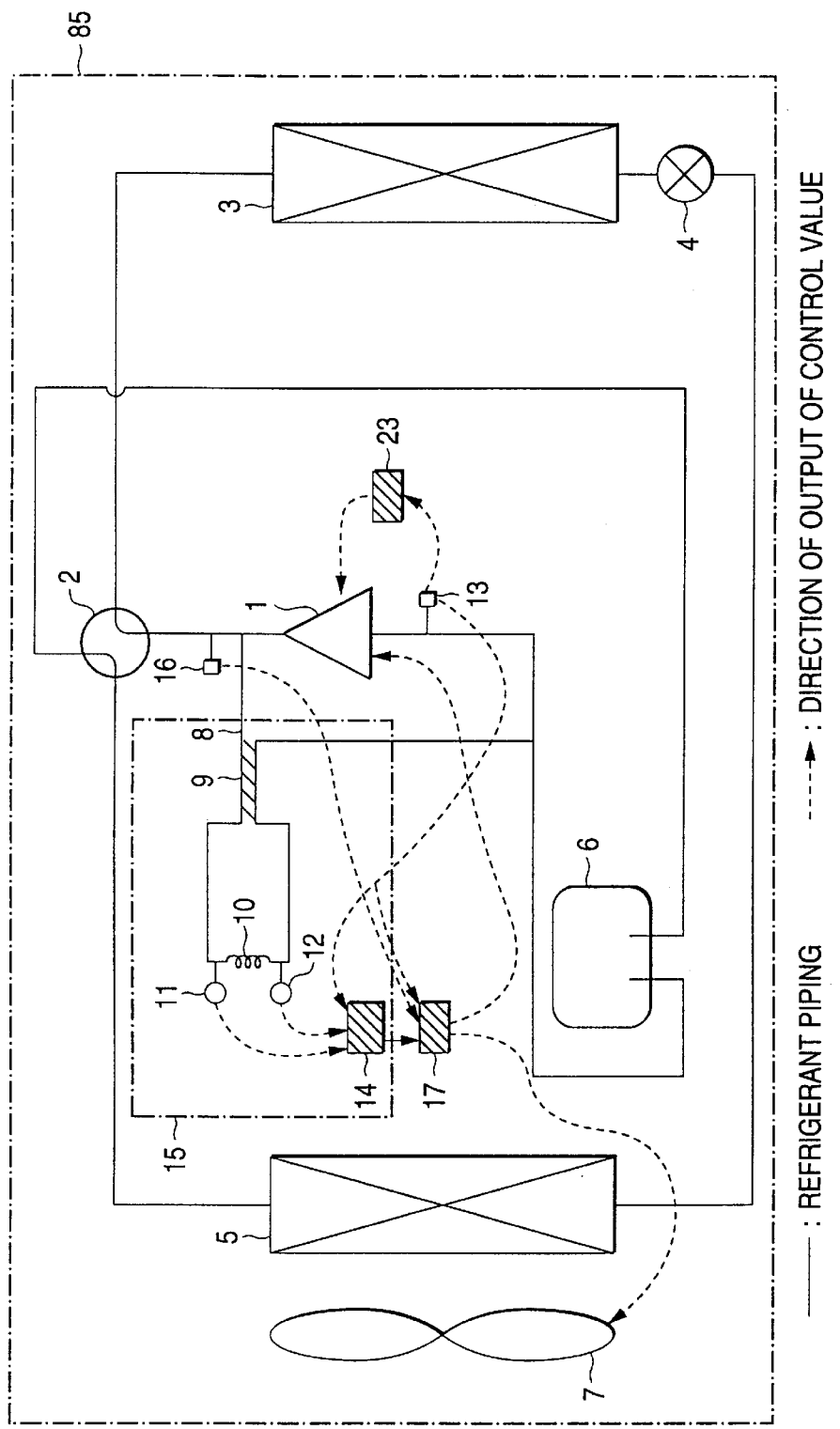
FIG. 7 is a diagram of a refrigerant circuit in accordance with a fifth embodiment of the present invention.

FIG. 7 illustrates a refrigerating apparatus 85 which is an example of the refrigerating and air-conditioning apparatus using a non-azeotropic refrigerant in accordance with the present invention. In this refrigerating apparatus 85, the compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 85 is provided with the cyclic-composition detecting device 15, the first pressure detector 16 provided at the discharge pipe of the compressor 1, and the second pressure detector 13 provided at the suction pipe of the compressor 1. Further, the outdoor-unit heat exchanger is provided with the fan 7, and the rotational speed of the fan 7 and the frequency of the compressor 1 are calculated and changed by the fan-rotating-speed/compressor-frequency outputting device 17. The refrigerating apparatus 85 is further provided with a first compressor-stop outputting device 23 for outputting a signal for stopping the compressor 1 in response to the value of the second pressure detector 13. The arrangement shown in FIG. 7 is similar to that of the first embodiment of the present invention except for the first compressor-stop outputting device 23, so that a description of the similar components will be omitted.

Next, a description will be given of control and operation in accordance with the fifth embodiment of the present invention. When the value of the second pressure detector 13 has become, for instance, 0 kgf/cm$^2$G or less, which is the pressure level indicating that the compressor should effect vacuum operation, the first compressor-stop outputting device 23 outputs a signal to stop the operation of the compressor 1, in response to which the compressor 1 is stopped. Consequently, the damage to the compressor due to corona discharge, which is liable to occur with R.407C, does not occur.

As the refrigerant in this embodiment, a refrigerant which is an HFC-based refrigerant and with which corona discharge is more liable to occur than R.22 is effective.

Sixth Embodiment

If the discharge temperature of the compressor is high, sludges which exert adverse effects on the refrigerant circuit, such as the clogging of the throttling device, increase, and frequently occur in cases where an ester oil or an ether oil is used as the refrigerating machine oil.

Accordingly, in a sixth embodiment of the present invention, control is provided to prevent the discharge temperature of the compressor from reaching a fixed value or more.

Figure 8:
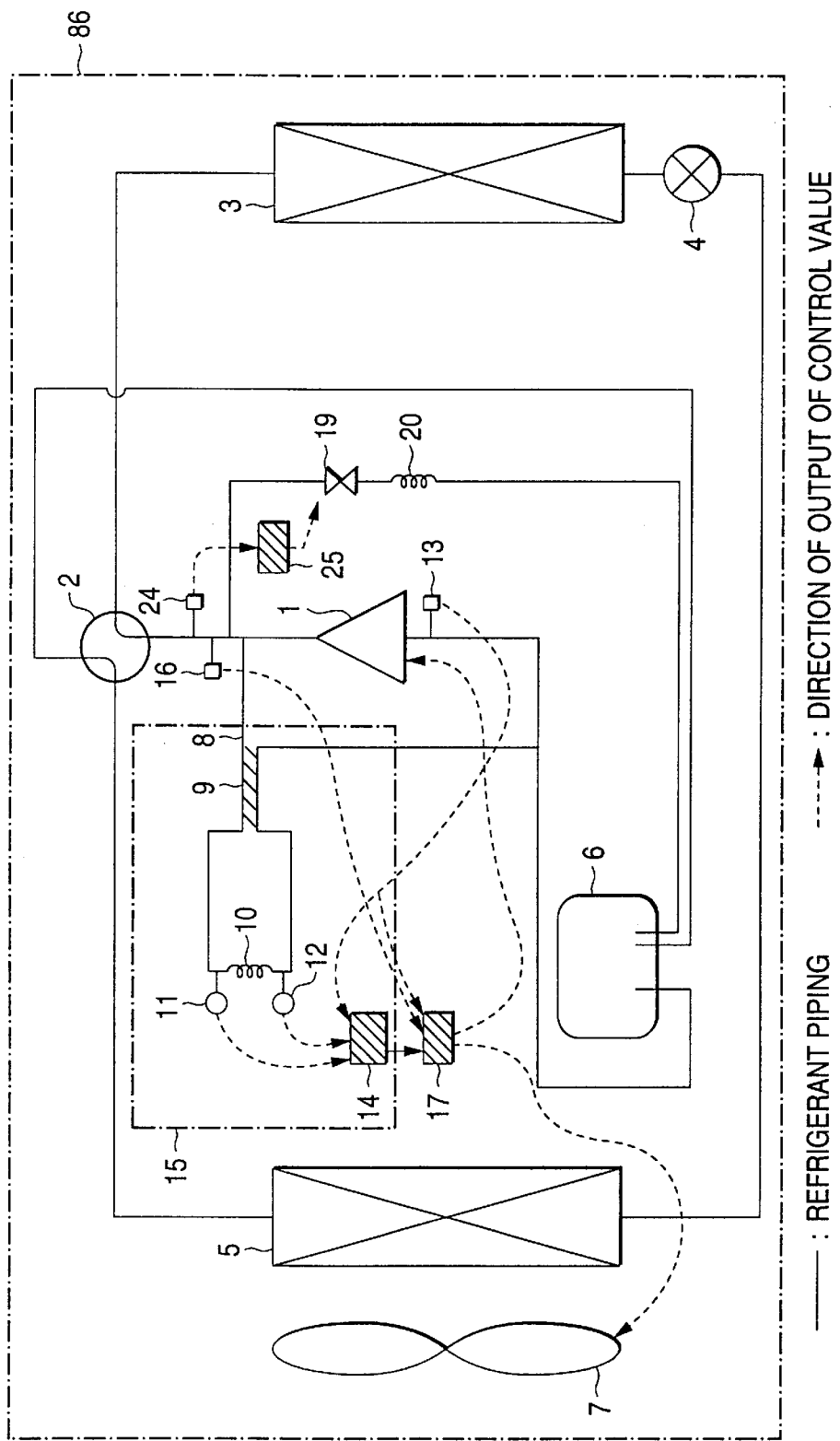
FIG. 8 is a diagram of a refrigerant circuit in accordance with a sixth embodiment of the present invention.

FIG. 8 illustrates a refrigerating apparatus 86 which is an example of the refrigerating and air-conditioning apparatus using a non-azeotropic refrigerant in accordance with the present invention. In this refrigerating apparatus 86, the compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 86 is provided with the cyclic-composition detecting device 15, the first pressure detector 16 and a third temperature detector 24 both provided at the discharge pipe of the compressor 1, and the second pressure detector 13 provided at the suction pipe of the compressor 1. Further, the outdoor-unit heat exchanger is provided with the fan 7, and the rotational speed of the fan 7 and the frequency of the compressor 1 are calculated and changed by the fan-rotating-speed/compressor-frequency outputting device 17. The refrigerating apparatus 86 is further provided with the bypass pipe, which connect the discharge pipe of the compressor 1 and the accumulator 6 and in which the opening/closing valve 19 and the second pressure reducing device 20 are connected in series. Further, the refrigerating apparatus 86 has a third opening/closing output device 25 for outputting a command on the opening and closing of the opening/closing valve 19 on the basis of the value of the third pressure detector 24. The arrangement shown in FIG. 8 is similar to that of the first embodiment of the present invention except for the bypass pipe with the opening/closing valve 19 and the second pressure reducing device 20 connected in series, the third temperature detector 24, and the third opening/closing output device 25, so that a description of the similar components will be omitted.

Next, a description will be given of control and operation in accordance with the sixth embodiment of the present invention. The third opening/closing output device 25 outputs to the opening/closing valve 19 a signal to close the opening/closing valve 19 when, during the operation of the compressor 1, the value of the third temperature detector 24 has become, for instance, less than 120° C., whereas the third opening/closing output device 25 outputs to the opening/closing valve 19 a signal to open the opening/closing valve 19 when the value of the third temperature detector 24 has become greater than or equal to 120° C. The opening/closing valve 19 is opened or closed in response to this signal. Through this control, part of the high-temperature, high-pressure gas at the discharge portion of the compressor 1 flows through the pipe in which the opening/closing valve 19 and the second pressure reducing device 20 are connected in series, and bypasses the main line so as to be supplied to the accumulator, so that the pressure and temperature at the discharge portion of the compressor 1 are reduced, and the occurrence of sludges is decreased.

As an alternative method, the operation of the compressor may be stopped when the value of the third temperature detector 24 has become greater than or equal to 120° C. during the operation of the compressor 1.

Seventh Embodiment

If the degree of superheating in the discharge portion of the compressor is low during the operation of the compressor, the compressor compresses the liquid refrigerant, and there is a possibility of causing damage to the compressor. Accordingly, in a seventh embodiment of the present invention, the degree of superheating in the discharge portion of the compressor is calculated from the values of the pressure detector and the temperature detector at the discharge pipe of the compressor and the value of the refrigerant cyclic composition so as to provide control for preventing this degree of superheating from falling below a predetermined value.

Figure 9:
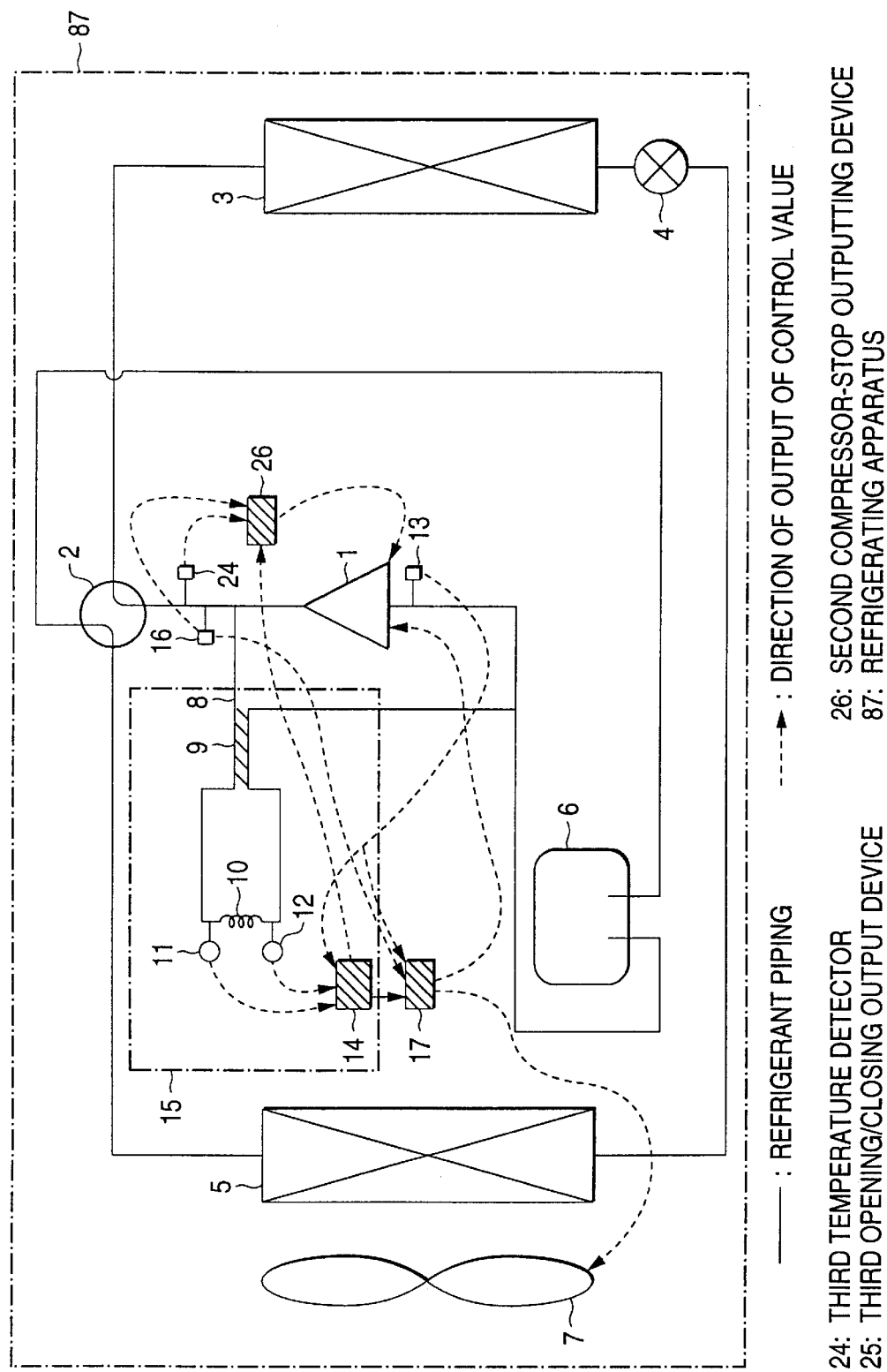
FIG. 9 is a diagram of a refrigerant circuit in accordance with a seventh embodiment of the present invention.

FIG. 9 illustrates a refrigerating apparatus 87 which is an example of the refrigerating and air-conditioning apparatus using a non-azeotropic refrigerant in accordance with the present invention. In this refrigerating apparatus 87, the compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 87 is provided with the cyclic-composition detecting device 15, the first pressure detector 16 and the third temperature detector 24 both provided at the discharge pipe of the compressor 1, and the second pressure detector 13 provided at the suction pipe of the compressor 1. Further, the outdoor-unit heat exchanger is provided with the fan 7, and the rotational speed of the fan 7 and the frequency of the compressor 1 are calculated and changed by the fan-rotating-speed/compressor-frequency outputting device 17. The refrigerating apparatus 87 is further provided with a second compressor-stop outputting device 26 for calculating a value TdSH which is the difference between the value of the third temperature detector 24 and the gas saturation temperature of the first pressure detector 16 (the latter being the temperature when all the liquid refrigerant has been converted to the gas refrigerant, and the values of the refrigerant cyclic composition a and the first pressure detector 16 are inputted), and for outputting a signal for stopping the compressor 1 on the basis of the value TdSH. The arrangement shown in FIG. 9 is similar to that of the first embodiment of the present invention except for the third temperature detector 24 and the second compressor-stop outputting device 26, so that a description of the similar components will be omitted.

Next, a description will be given of control and operation in accordance with the seventh embodiment of the present invention. During the operation of the compressor 1, the second compressor-stop outputting device 26 calculates the value TdSH which is the difference between the value of the third temperature detector 24 and the gas saturation temperature of the first pressure detector 16 (the latter being the temperature when all the liquid refrigerant has been converted to the gas refrigerant, and the values of the refrigerant cyclic composition a and the first pressure detector 16 are inputted). When the state in which this value TdSH is less than or equal to a predetermined value in which range a predetermined degree of superheating cannot be obtained, i.e., liquid compression is considered to be present, e.g., 20 degrees, continues for a predetermined time duration, e.g., for 10 minutes, the operation of the compressor 1 is stopped, thereby preventing damage to the compressor.

Figure 10:
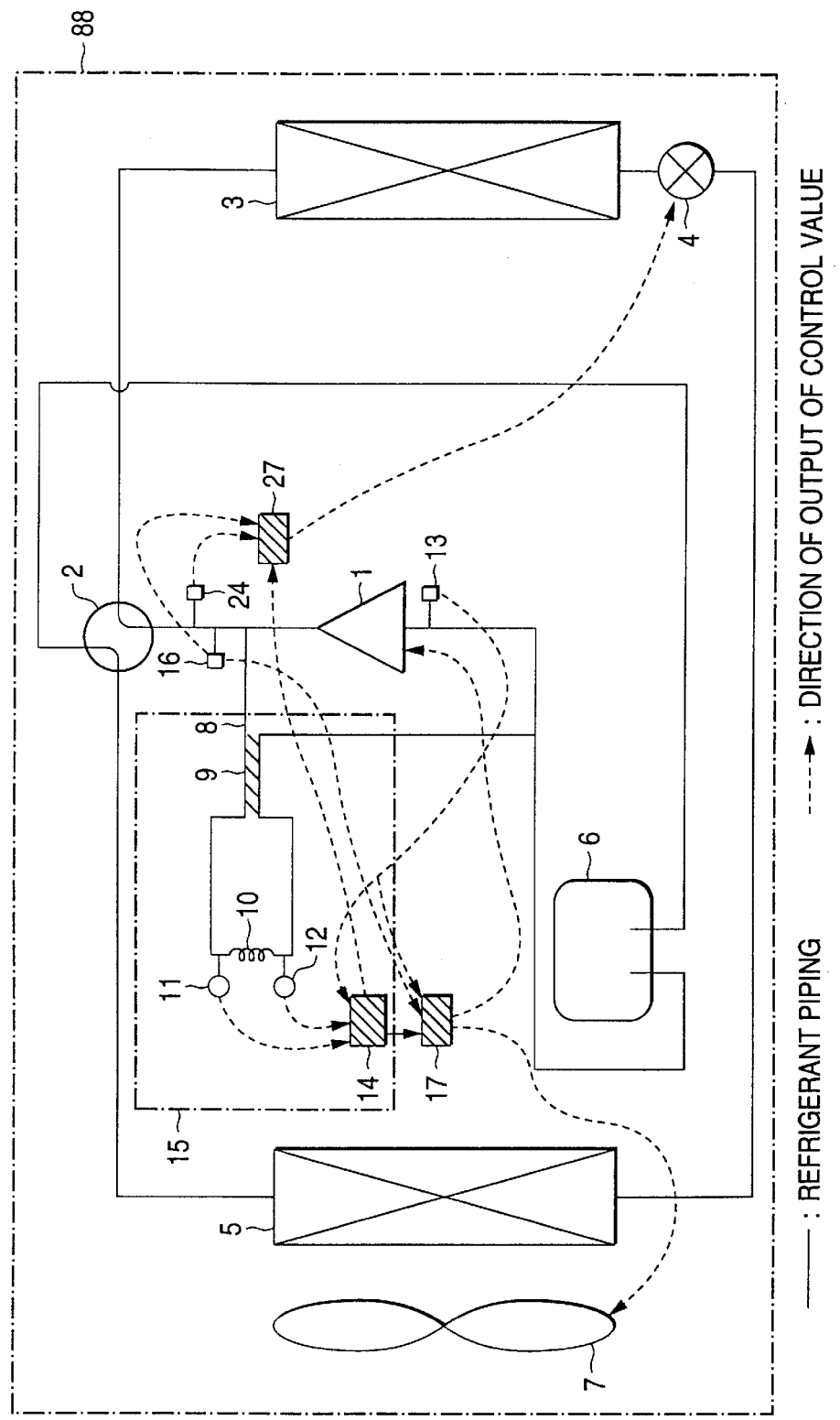
FIG. 10 is a diagram of a refrigerant circuit in accordance with a modification of the seventh embodiment of the present invention.
Figure 11:
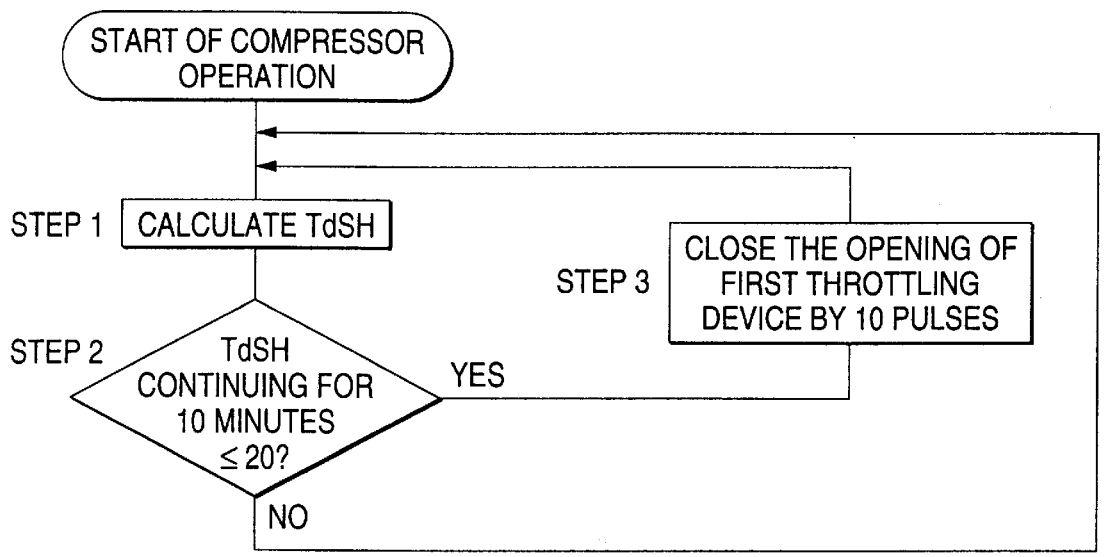
FIG. 11 is a control flowchart in accordance with the modification of the seventh embodiment of the present invention.

In addition, as an alternative method, a refrigerating apparatus such as the one shown in FIG. 10 may be controlled as shown in FIG. 11. FIG. 10 illustrates a refrigerating apparatus 88 which is an example of the refrigerating and air-conditioning apparatus using a non-azeotropic refrigerant in accordance with the present invention. In this refrigerating apparatus 88, the compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 88 is provided with the cyclic-composition detecting device 15, the first pressure detector 16 and the third temperature detector 24 both provided at the discharge pipe of the compressor 1, and the second pressure detector 13 provided at the suction pipe of the compressor 1. Further, the outdoor-unit heat exchanger is provided with the fan 7, and the rotational speed of the fan 7 and the frequency of the compressor 1 are calculated and changed by the fan-rotating-speed/compressor-frequency outputting device 17. The refrigerating apparatus 88 is further provided with a throttling-device-opening reduction outputting device 27 for calculating the value TdSH which is the difference between the value of the third temperature detector 24 and the gas saturation temperature of the first pressure detector 16 (the latter being the temperature when all the liquid refrigerant has been converted to the gas refrigerant, and the values of the refrigerant cyclic composition a and the first pressure detector 16 are inputted), and for outputting a signal for reducing the opening of the first throttling device 4 on the basis of the value TdSH. The arrangement shown in FIG. 10 is similar to that of the first embodiment of the present invention except for the third temperature detector 24 and the throttling-device-opening reduction outputting device 27, so that a description of the similar components will be omitted.

Next, a description will be given of control and operation in accordance with the above-described modification of the seventh embodiment of the present invention. In terms of the contents of control in FIG. 11, during the operation of the compressor 1, the throttling-device-opening reduction outputting device 27 calculates the value TdSH which is the difference between the value of the third temperature detector 24 and the gas saturation temperature of the first pressure detector 16 (the latter being the temperature when all the liquid refrigerant has been converted to the gas refrigerant, and the values of the refrigerant cyclic composition a and the first pressure detector 16 are inputted) (Step 1). The throttling-device-opening reduction outputting device 27 determines whether or not the state in which this value TdSH is less than or equal to a predetermined value in which range a predetermined degree of superheating cannot be obtained, i.e., liquid compression is considered to be present, e.g., 20 degrees, continues for 10 minutes (Step 2). If the state of the value being less than or equal to 20 degrees continues for 10 minutes, the opening of the first throttling device 4 is closed by a predetermined amount, e.g., 10 pulses (Step 3). Then, the first throttling device 4 is closed until TdSH becomes greater than 20 degrees. As the first throttling device 4 is closed, the difference between the discharge pressure and suction pressure of the compressor can be increased, and energy supplied from the compressor to the refrigerant is increased, thereby facilitating the gasification of the refrigerant.

Eighth Embodiment

If the temperature of the refrigerating machine oil in the compressor becomes high, the lubricity of the refrigerating machine oil declines, and there is a possibility of causing damage to the compressor. With the refrigerant circuit such as the one in accordance with the sixth embodiment of the present invention, however, it is impossible to accurately ascertain the temperature of the refrigerating machine oil (particularly in the case of R.407C, an error in the cyclic composition of the refrigerant affects the error in the detection of the temperature of the refrigerating machine oil, it is more difficult to ascertain the temperature of the refrigerating machine oil than in the case of R.22). Accordingly, in an eighth embodiment of the present invention, a temperature detector is provided at a position where the temperature of the refrigerating machine oil in the compressor body can be measured, and control is provided for protecting the compressor by ensuring that the operation will be not be effected for an extended time when the temperature of this temperature detector is at a fixed level or more.

Figure 12:
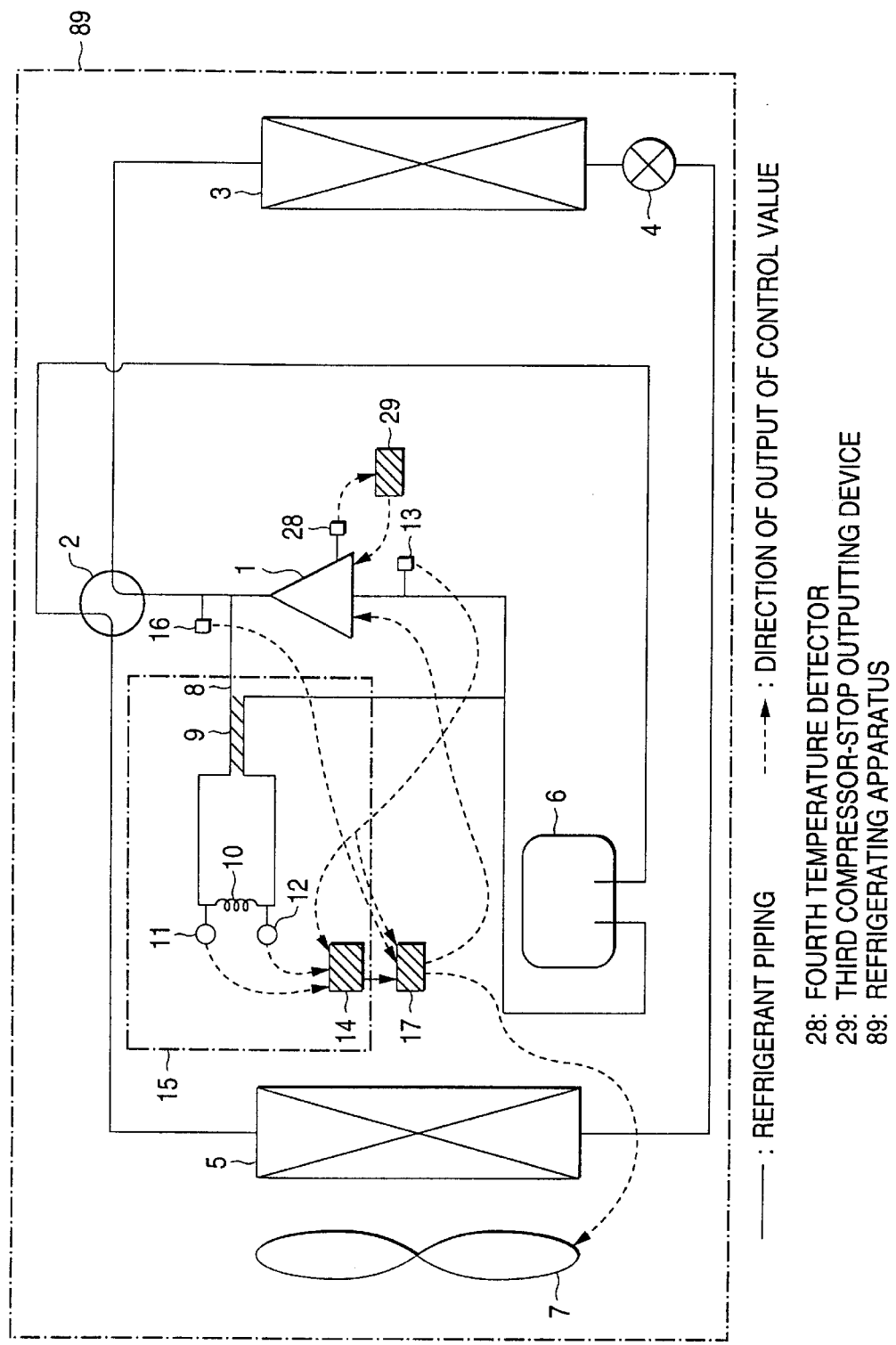
FIG. 12 is a diagram of a refrigerant circuit in accordance with an eighth embodiment of the present invention.

FIG. 12 illustrates a refrigerating apparatus 89 which is an example of the refrigerating and air-conditioning apparatus using a non-azeotropic refrigerant in accordance with the present invention. In this refrigerating apparatus 89, the compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 89 is provided with the cyclic-composition detecting device 15, the first pressure detector 16 provided at the discharge pipe of the compressor 1, a fourth temperature detector 28 provided at a position where the temperature of the refrigerating machine oil in a lower portion of the body of the compressor 1 can be detected, and the second pressure detector 13 provided at the suction pipe of the compressor 1. Further, the outdoor-unit heat exchanger is provided with the fan 7, and the rotational speed of the fan 7 and the frequency of the compressor 1 are calculated and changed by the fan-rotating-speed/compressor-frequency outputting device 17. The refrigerating apparatus 89 is further provided with a third compressor-stop outputting device 29 for outputting a signal for stopping the compressor 1 on the basis of the value of the fourth temperature detector 28. The arrangement shown in FIG. 12 is similar to that of the first embodiment of the present invention except for the fourth temperature detector 28 and the third compressor-stop outputting device 29, so that a description of the similar components will be omitted.

Next, a description will be given of control and operation in accordance with the eighth embodiment of the present invention. During the operation of the compressor 1, the third compressor-stop outputting device 29 detects that the value of the fourth temperature detector 22 has reached a predetermined value, e.g., 100° C., and that this state has continued for 60 minutes. In that case, the third compressor-stop outputting device 29 outputs a signal for stopping the operation of the compressor 1, so that the compressor 1 stops.

Ninth Embodiment

If the concentration of the refrigerating machine oil in the compressor becomes low, the lubricity of the refrigerating machine oil declines, and there is a possibility of causing damage to the compressor. Accordingly, in a ninth embodiment of the present invention, the concentration of the refrigerating machine oil in the compressor body is represented as the difference between the temperature of the refrigerating machine oil and the saturation temperature of the refrigerant gas at the pressure of the suction side of the compressor, and control is provided for protecting the compressor by ensuring that the operation will be not be effected for an extended time when this value is at a fixed level or more.

Figure 13:
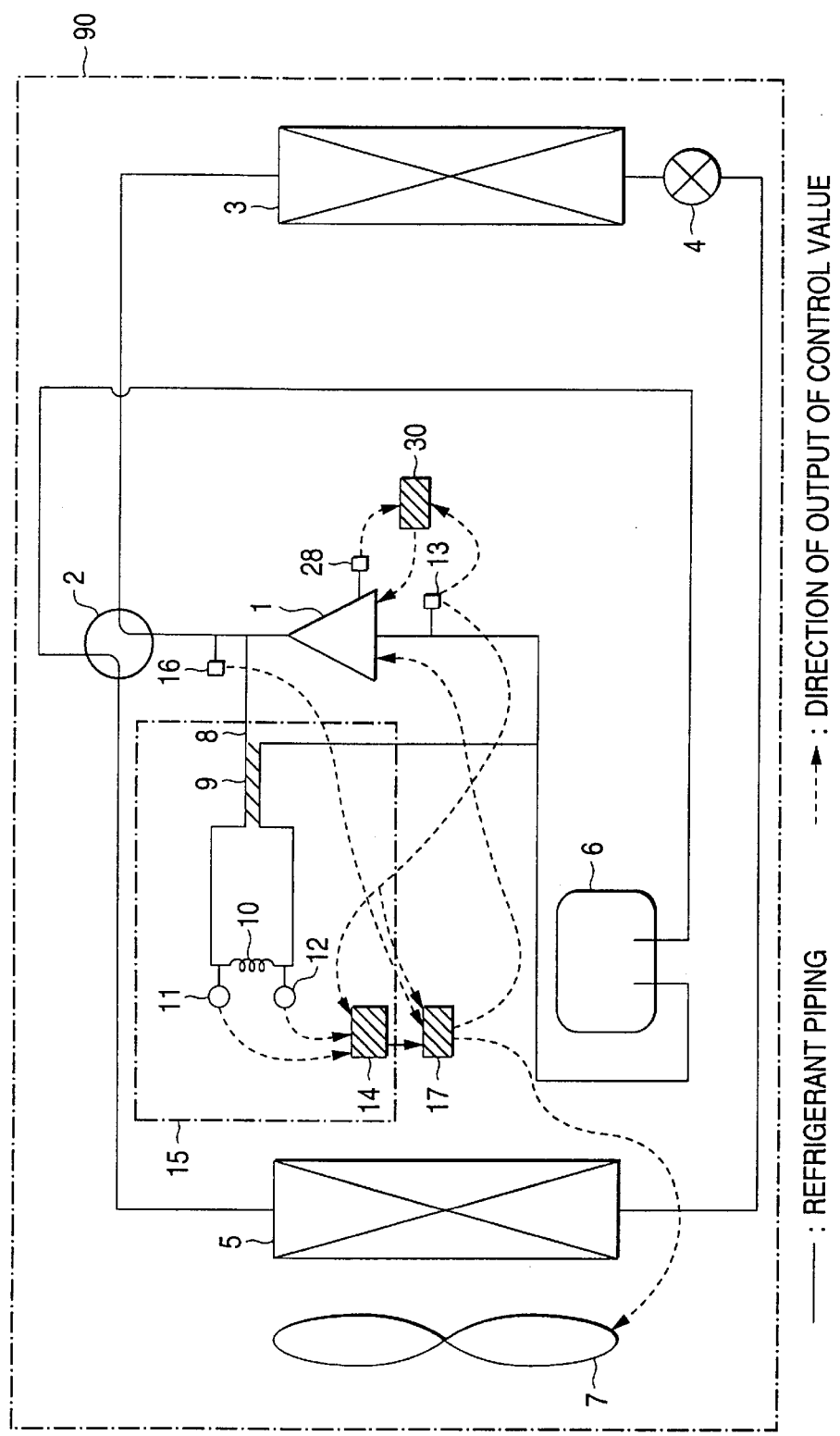
FIG. 13 is a diagram of a refrigerant circuit in accordance with a ninth embodiment of the present invention.

FIG. 13 illustrates a refrigerating apparatus 90 which is an example of the refrigerating and air-conditioning apparatus using a non-azeotropic refrigerant in accordance with the present invention. In this refrigerating apparatus 90, the compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 90 is provided with the cyclic-composition detecting device 15, the first pressure detector 16 provided at the discharge pipe of the compressor 1, a fourth temperature detector 28 provided at a position where the temperature of the refrigerating machine oil in a lower portion of the body of the compressor 1 can be detected, and the second pressure detector 13 provided at the suction pipe of the compressor 1. Further, the outdoor-unit heat exchanger 5 is provided with the fan 7, and the rotational speed of the fan 7 and the frequency of the compressor 1 are calculated and changed by the fan-rotating-speed/compressor-frequency outputting device 17. The refrigerating apparatus 90 is further provided with a fourth compressor-stop outputting device 30 for calculating a value TsSH which is the difference between the value of the fourth temperature detector 28 and the gas saturation temperature of the second pressure detector 13 (the latter being the temperature when all the liquid refrigerant has been converted to the gas refrigerant, and the values of the refrigerant cyclic composition a and the second pressure detector 13 are inputted), and for outputting a signal for stopping the operation of the compressor 1 on the basis of the value TsSH. The arrangement shown in FIG. 13 is similar to that of the first embodiment of the present invention except for the third temperature detector 28 and the fourth compressor-stop outputting device 30, so that a description of the similar components will be omitted.

Next, a description will be given of control and operation in accordance with the ninth embodiment of the present invention. During the operation of the compressor 1, the fourth compressor-stop outputting device 30 detects that the value TsSH which is the difference between the value of the fourth temperature detector 28 and the gas saturation temperature of the second pressure detector 13 (the latter being the temperature when all the liquid refrigerant has been converted to the gas refrigerant, and the values of the refrigerant cyclic composition a and the second pressure detector 13 are inputted) has become less than or equal to a predetermined value, e.g., 10 degrees or less, which indicates that the refrigerant is mixed in the refrigerating machine oil in a large quantity, and that this state has continued for 60 minutes. In that case, the fourth compressor-stop outputting device 30 outputs a signal for stopping the operation of the compressor 1, so that the compressor 1 stops.

10th Embodiment

Figure 14:
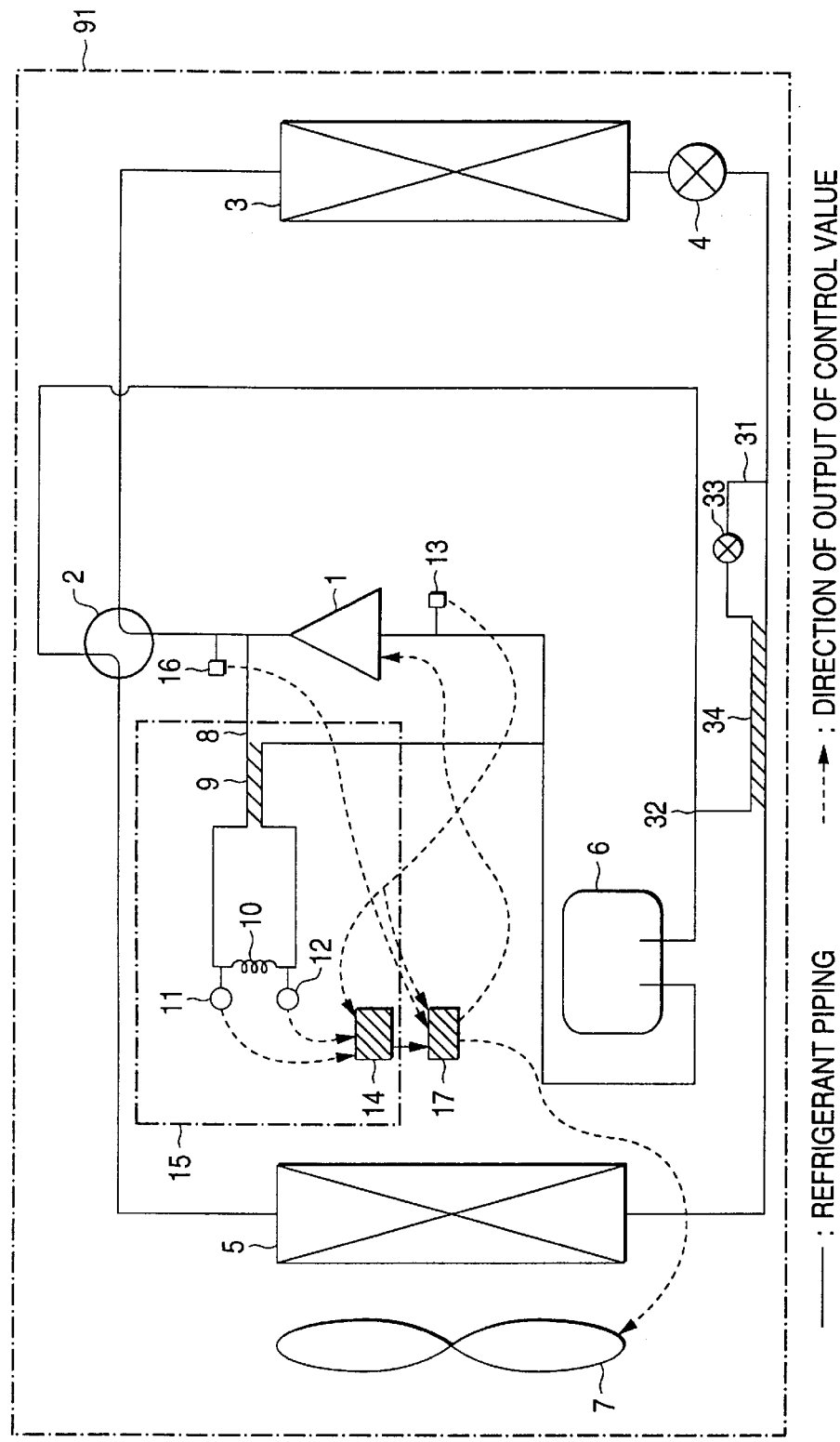
FIG. 14 is a diagram of a refrigerant circuit in accordance with a 10th embodiment of the present invention.
Figure 15:
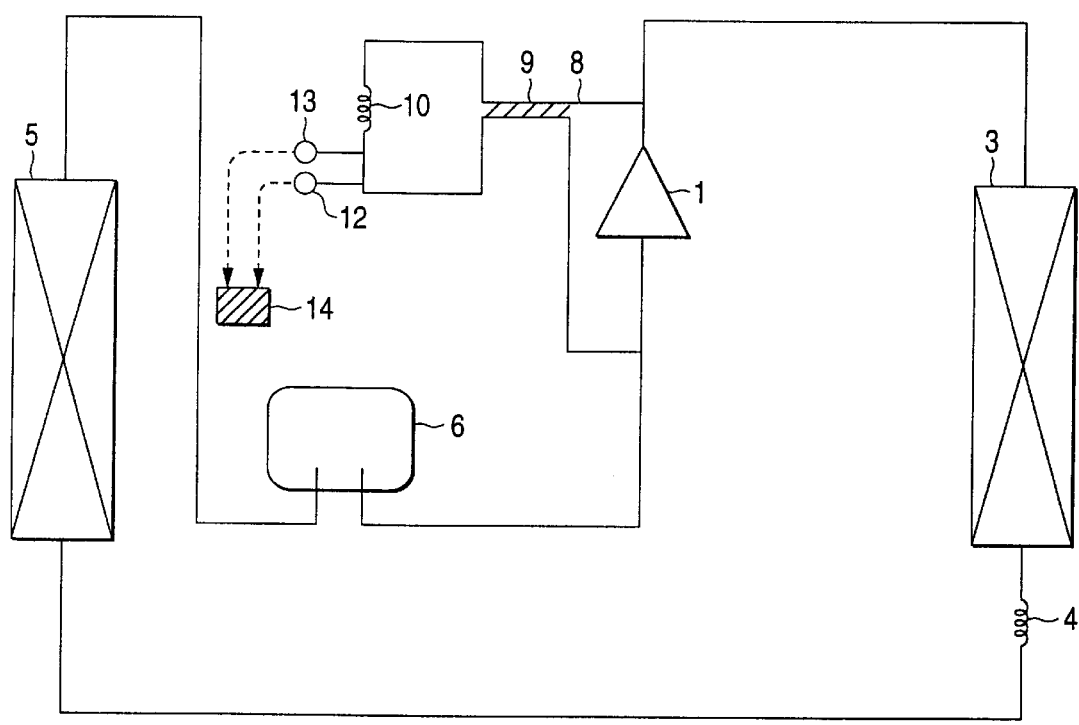
FIG. 15 is a diagram of a refrigerant circuit in accordance with the conventional art.

FIG. 14 illustrates a refrigerating apparatus 91 which is an example of the refrigerating and air-conditioning apparatus using a non-azeotropic refrigerant in accordance with the present invention. In this refrigerating apparatus 91, the compressor 1, the four-way valve 2, the indoor-unit heat exchanger 3 which is the using-side heat exchanger, the first throttling device 4, the outdoor-unit heat exchanger 5 which is the heat source unit-side heat exchanger, the accumulator 6, and the compressor 1 are connected in series in this order by the piping, thereby forming the refrigerant circuit. At the same time, through a changeover by the four-way valve, the compressor 1, the four-way valve 2, the outdoor-unit heat exchanger 5, the first throttling device 4, the indoor-unit heat exchanger 3, the accumulator 6, and the compressor 1 are connected in series in this order by the piping, thereby forming another refrigerant circuit. In addition, the refrigerating apparatus 91 is provided with the cyclic-composition detecting device 15, the first pressure detector 16 provided at the discharge pipe of the compressor 1, and the second pressure detector 13 provided at the suction pipe of the compressor 1. Further, the outdoor-unit heat exchanger is provided with the fan 7, and the rotational speed of the fan 7 and the frequency of the compressor 1 are calculated and changed by the fan-rotating-speed/compressor-frequency outputting device 17. The refrigerating apparatus 91 is further provided with a refrigerant circuit which connect a first branching point 31 located between the heat exchangerhh 5 and the first throttling device 4 and a second branching point 32 located between the four-way valve 2 and the accumulator 6, and in which a second throttling device 33 and a second double-pipe heat exchanger 34 for effecting heat exchange with a portion of the pipe between the heat exchangerhh 5 and the first branching point 31 are connected in series by the piping. The first branching point 31, the second branching point 32, the second throttling device 33, and the second double-pipe heat exchanger 34 form a subcooling device. The arrangement shown in FIG. 14 is similar to that of the first embodiment of the present invention except for the refrigerant circuit which connect the first branching point 31 located between the heat exchangerhh 5 and the first throttling device 4 and the second branching point 32 located between the four-way valve 2 and the accumulator 6, and in which the second throttling device 33 and the second double-pipe heat exchanger 34 for effecting heat exchange with a portion of the pipe between the heat exchangerhh 5 and the first branching point 31 are connected in series by the piping, so that a description of the similar components will be omitted.

Next, a description will be given of control and operation in accordance with the 10th embodiment of the present invention. In the second double-pipe heat exchanger 34, the refrigerant which has undergone heat exchange with the outdoor-unit heat exchanger 5 during cooling undergoes heat exchange with the low-pressure two-phase refrigerant subjected to pressure reduction by passing through the second throttling device from the first branching point, thereby securing the degree of subcooling. At this time, in the case of R.407C, the degree of subcooling assumes a value in which the temperature at that place is subtracted from the liquid saturation temperature under the pressure at that place, while, in the case of R22, the degree of subcooling assumes a value in which the temperature at that place is subtracted from the saturation temperature under the pressure at that place. For this reason, since the degree of subcooling is difficult to secure for R.407C, this embodiment of the present invention becomes effective. By securing the degree of subcooling, it is possible to prevent the occurrence of refrigerant noise in the throttling device of the indoor unit (first throttling device 4).

Although in the above-described embodiments a description has been given by citing the case of R.407C in the main, the present invention is also valid for such as R.404A and R.407A which are non-azeotropic refrigerants and for R.410A and R410B which are pseudo-azeotropic refrigerants.

ADVANTAGES OF THE INVENTION

As described above, in accordance with a first aspect of the present invention, there is provided a refrigerating apparatus using a non-azeotropic refrigerant and provided with a refrigerant circuit in which a capacity variable compressor, a heat source unit-side heat exchanger, a throttling device, and a using-side heat exchanger are connected by the piping, a capability variable fan for the heat source unit-side heat exchanger, a first pressure detector at a discharge pipe of the compressor, a second pressure detector at a suction pipe of the compressor, and a refrigerant cyclic-composition detecting device, comprising:

fan/compressor capacity controlling means for determining a condensing temperature of the heat source unit-side heat exchanger or the using-side heat exchanger on the basis of a refrigerant cyclic composition detected by the cyclic-composition detecting device and a pressure detected by the first pressure detector, or determining an evaporating temperature of the heat source unit-side heat exchanger or the using-side heat exchanger on the basis of the refrigerant cyclic composition detected by the cyclic-composition detecting device and a pressure detected by the second pressure detector, so as to control the capacity of the compressor and the capability of the fan for the heat source unit-side heat exchanger so that the condensing temperature and the evaporating temperature are set to respective predetermined target values. Accordingly, even with the refrigerating apparatus using a non-azeotropic refrigerant, operation is carried out with the condensing temperature and the evaporating temperature fixed by taking the cyclic composition of the refrigerant into consideration, so that it is possible to secure a stable capacity.

In accordance with a second aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a first pressure detector at a discharge pipe of the compressor, a second pressure detector at a suction pipe of the compressor, a refrigerant cyclic-composition detecting device, and a temperature detector for detecting the temperature of the refrigerant on an upstream side of the throttling device, comprising:

a subcooling calculator for determining a condensing temperature of the heat source unit-side heat exchanger or the using-side heat exchanger on the basis of a refrigerant cyclic composition detected by the cyclic-composition detecting device and a pressure detected by the first pressure detector, for calculating a subcooling value of the refrigerant which enters the throttling device on the basis of the condensing temperature and the temperature detected by the temperature detector; and a throttling-device minimum opening outputting device for calculating a minimum opening of the throttling device on the basis of the refrigerant cyclic composition detected by the cyclic-composition detecting device, the pressure detected by the first pressure detector, and a pressure detected by the second pressure detector, for comparing the calculated minimum opening with an opening command from the subcooling calculator, and for outputting to the throttling device the opening command if the opening command is greater than the calculated minimum opening, and the calculated minimum opening if the opening command is less than or equal to the calculated minimum opening. Accordingly, even with the refrigerating apparatus using a non-azeotropic refrigerant, it is possible to make compatible the securing of the rate of flow in the refrigerant circuit and the securing of subcooling on the refrigerant inlet side of the throttling device.

In accordance with a third aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a second pressure detector at a suction pipe of the compressor, and a bypass pipe for connecting a discharge pipe and the suction pipe of the compressor and having an opening/closing valve and a pressure reducing device, comprising:

a first opening/closing output device for opening the opening/closing valve if a pressure detected by the second pressure detector is less than a predetermined value and for closing the opening/closing valve if the pressure detected by the second pressure detector is greater than or equal to the predetermined value. Accordingly, even with the refrigerating apparatus using a non-azeotropic refrigerant, it is possible to raise the compressor suction pressure with higher efficiency than in a case where a single refrigerant or a pseudo-azeotropic refrigerant is used.

In accordance with a fourth aspect of the present invention, there is provided a refrigerating apparatus using as a refrigerant a refrigerant which is an HFC-based refrigerant and whose saturation pressure is high at an identical temperature, the refrigerating apparatus being provided with a refrigerant circuit in which a compressor, a heat source unit-side heat exchanger, a throttling device, and a using-side heat exchanger are connected by the piping, a first pressure detector at a discharge pipe of the compressor, and a bypass pipe for connecting a discharge pipe and the suction pipe of the compressor and having an opening/closing valve and a pressure reducing device, comprising:

a second opening/closing output device for opening the opening/closing valve if a pressure detected by the first pressure detector is greater than or equal to a predetermined value and for closing the opening/closing valve if the pressure detected by the first pressure detector is less than the predetermined value. Accordingly, even with the refrigerating apparatus using R.407C or the like whose pressure is higher than R.22 at an identical temperature, it is possible to prevent damage to the compressor due to an excessive rise in the pressure at the discharge portion of the compressor.

In accordance with a fifth aspect of the present invention, there is provided a refrigerating apparatus using as a refrigerant a refrigerant which is an HFC-based refrigerant and with which corona discharge is more liable to occur than R22, the refrigerating apparatus being provided with a refrigerant circuit in which a compressor, a heat source unit-side heat exchanger, a throttling device, and a using-side heat exchanger are connected by the piping, and a second pressure detector at a suction pipe of the compressor, comprising:

a first compressor-stop outputting device for stopping the operation of the compressor if a pressure detected by the second pressure detector has become less than or equal to a predetermined value which indicates that the compressor is to effect vacuum operation. Accordingly, with the refrigerating apparatus using R.407C or the like, in which damage to the compressor is more liable to occur due to corona discharge under vacuum than the apparatus using R22, it is possible to eliminate damage to the compressor due to corona discharge.

In accordance with a sixth aspect of the present invention, there is provided a refrigerating apparatus using an HFC-based refrigerant as a refrigerant and provided with a refrigerant circuit in which a compressor, a heat source unit-side heat exchanger, a throttling device, and a using-side heat exchanger are connected by the piping, a third temperature detector at a discharge pipe of the compressor, and a bypass pipe for connecting a discharge pipe and the suction pipe of the compressor and having an opening/closing valve and a pressure reducing device, comprising:

a third opening/closing output device for opening the opening/closing valve if a value detected- by the third temperature detector is greater than or equal to a predetermined value and for closing the opening/closing valve if the pressure detected by the third temperature detector is less than the predetermined value. Accordingly, by controlling the temperature at the discharge portion of the compressor to a fixed level or less, it is possible to suppress the amount of sludge which can otherwise occur in a large amount in the refrigerating machine using, for instance, the refrigerant R.407C, i.e., an HFC-based refrigerant, and an ester oil or an ether oil which is a refrigerating machine oil used for the refrigerant R.407C.

In accordance with a seventh aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a first pressure detector at a discharge pipe of the compressor, a third temperature detector at a discharge pipe of the compressor, and a refrigerant cyclic-composition detecting device, comprising:

a second compressor-stop outputting device for calculating a degree of superheating at the discharge pipe of the compressor on the basis of values detected by the first pressure detector, the third temperature detector, and the refrigerant cyclic-composition detecting device, and for stopping the operation of the compressor if a state in which the degree of superheating is less than or equal to a predetermined value has continued for a predetermined time duration. Accordingly, even with the refrigerating apparatus using a non-azeotropic refrigerant, it is possible to prevent damage to the compressor due to the compression of the liquid refrigerant in the compressor.

In accordance with an eighth aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a first pressure detector at a discharge pipe of the compressor, a third temperature detector at a discharge pipe of the compressor, and a refrigerant cyclic-composition detecting device, comprising:

a throttling-device-opening reduction outputting device for calculating a degree of superheating at the discharge pipe of the compressor on the basis of values detected by the first pressure detector, the third temperature detector, and the refrigerant cyclic-composition detecting device, and for closing an opening of the throttling device by a predetermined amount if a state in which the degree of superheating is less than or equal to a predetermined value has continued for a predetermined time duration. Accordingly, even with the refrigerating apparatus using a non-azeotropic refrigerant, it is possible to prevent damage to the compressor due to the compression of the liquid refrigerant in the compressor.

In accordance with a ninth aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, comprising:

a fourth temperature detector for detecting a temperature of a refrigerating machine oil in the compressor; and a third compressor-stop outputting device for stopping the operation of the compressor if a value detected by the fourth temperature detector has become greater than or equal to a predetermined value, and if the state in which the detected value is greater than or equal to the predetermined value has continued for a predetermined time duration. Accordingly, in the refrigerating apparatus using a non-azeotropic refrigerant, it is possible to prevent damage to the compressor due to excessive superheating of the compressor by detecting the excessive superheating of the compressor which is difficult to be detected on the discharge side of the compressor.

In accordance with a 10th aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, a second pressure detector at a suction pipe of the compressor, and a refrigerant cyclic-composition detecting device, comprising:

a fourth compressor-stop outputting device for stopping the operation of the compressor if a difference between a temperature of a refrigerating machine oil detected by the fourth temperature detector in the compressor and a gas saturation temperature at a pressure detected by the second pressure detector with a composition of the refrigerant detected by the cyclic-composition detecting device has become less than or equal to a predetermined value, and if this state has continued for a predetermined time duration. Accordingly, even in the refrigerating apparatus using a non-azeotropic refrigerant, it is possible to detect the excessive superheating of the liquid refrigerant, so that it is possible to prevent damage to the compressor caused by a decline in the lubricity of the refrigerating machine oil due to the excessive superheating of the liquid refrigerant.

In accordance with an 11th aspect of the present invention, there is provided a refrigerating apparatus using a non-azeotropic refrigerant and provided with a refrigerant circuit in which a compressor, a heat source unit-side heat exchanger, a throttling device, and a using-side heat exchanger are connected by the piping, comprising:

a subcooling device for subcooling the refrigerant between the heat source unit-side heat exchanger and the throttling device during cooling operation. Accordingly, even with the refrigerating apparatus using a non-azeotropic refrigerant in which it is difficult to obtain subcooling at the outlet of the condenser, it is possible to secure subcooling at the outlet of the condenser.

What is claimed is:

1. A refrigerating apparatus using a non-azeotropic refrigerant and provided with a refrigerant circuit in which a capacity variable compressor, a heat source unit-side heat exchanger, a throttling device, and a using-side heat exchanger are connected by the piping, a capability variable fan for said heat source unit-side heat exchanger, a first pressure detector at a discharge pipe of said compressor, a second pressure detector at a suction pipe of said compressor, and a refrigerant cyclic-composition detecting device, comprising:

fan/compressor capacity controlling means for determining a condensing temperature of said heat source unit-side heat exchanger or said using-side heat exchanger on the basis of a refrigerant cyclic composition detected by said cyclic-composition detecting device and a pressure detected by said first pressure detector, or determining an evaporating temperature of said heat source unit-side heat exchanger or said using-side heat exchanger on the basis of the refrigerant cyclic composition detected by said cyclic-composition detecting device and a pressure detected by said second pressure detector, so as to control the capacity of said compressor and the capability of said fan for said heat source unit-side heat exchanger so that the condensing temperature and the evaporating temperature are set to respective predetermined target values.

2. The refrigerating apparatus according to claim 1, wherein said refrigerating apparatus uses an HFC-based refrigerant with which corona discharge is more liable to occur than R.22, said refrigerating apparatus further comprising:

a first compressor-stop outputting device configured to prevent the operation of said compressor when a pressure detected by said second pressure detector is less than or equal to a predetermined value which indicates that said compressor is to effect vacuum operation.

3. A refrigerating apparatus using a non-azeotropic refrigerant and provided with a refrigerant circuit in which a compressor, a heat source unit-side heat exchanger, a throttling device, and a using-side heat exchanger are connected by the piping, a first pressure detector at a discharge pipe of said compressor, a second pressure detector at a suction pipe of said compressor, a refrigerant cyclic-composition detecting device, and a temperature detector for detecting the temperature of the refrigerant on an upstream side of said throttling device, comprising:

a subcooling calculator for determining a condensing temperature of said heat source unit-side heat exchanger or said using-side heat exchanger on the basis of a refrigerant cyclic composition detected by said cyclic-composition detecting device and a pressure detected by said first pressure detector, for calculating a subcooling value of the refrigerant which enters said throttling device on the basis of the condensing temperature and the temperature detected by said temperature detector; and a throttling-device minimum opening outputting device for calculating a minimum opening of said throttling device on the basis of the refrigerant cyclic composition detected by said cyclic-composition detecting device, the pressure detected by said first pressure detector, and a pressure detected by said second pressure detector, for comparing the calculated minimum opening with an opening command from said subcooling calculator, and for outputting to said throttling device the opening command if the opening command is greater than the calculated minimum opening, and the calculated minimum opening if the opening command is less than or equal to the calculated minimum opening.

4. A refrigerating apparatus using a non-azeotropic refrigerant and provided with a refrigerant circuit in which a compressor, a heat source unit-side heat exchanger, a throttling device, and a using-side heat exchanger are connected by the piping, a first pressure detector at a discharge pipe of said compressor, a third temperature detector at a discharge pipe of said compressor, and a refrigerant cyclic-composition detecting device, comprising:

a second compressor-stop outputting device for calculating a degree of superheating at the discharge pipe of said compressor on the basis of values detected by said first pressure detector, said third temperature detector, and said refrigerant cyclic-composition detecting device, and for stopping the operation of said compressor if a state in which the degree of superheating is less than or equal to a predetermined value has continued for a predetermined time duration.

* * * * *